(12) United States Patent
Credelle et al.

(10) Patent No.: US 7,755,652 B2
(45) Date of Patent: Jul. 13, 2010

(54) COLOR FLAT PANEL DISPLAY SUB-PIXEL RENDERING AND DRIVER CONFIGURATION FOR SUB-PIXEL ARRANGEMENTS WITH SPLIT SUB-PIXELS

(75) Inventors: Thomas Lloyd Credelle, Morgan Hill, CA (US); Candice Hellen Brown Elliott, Vallejo, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 836 days.

(21) Appl. No.: 11/468,763

(22) Filed: Aug. 30, 2006

(65) Prior Publication Data
US 2007/0064020 A1 Mar. 22, 2007

Related U.S. Application Data

(63) Continuation-in-part of application No. 10/278,352, filed on Oct. 22, 2002, now Pat. No. 7,417,648, and a continuation-in-part of application No. 10/821,353, filed on Apr. 9, 2004, now Pat. No. 7,583,279.

(60) Provisional application No. 60/346,738, filed on Jan. 7, 2002.

(51) Int. Cl.
*G09G 5/02* (2006.01)
(52) U.S. Cl. .......... 345/694; 345/690; 345/695
(58) Field of Classification Search .......... 345/87, 345/92, 589, 694, 690, 695, 698; 349/109, 349/144
See application file for complete search history.

(56) References Cited
U.S. PATENT DOCUMENTS

| 3,971,065 A | 7/1976 | Bayer |
| 4,353,062 A | 10/1982 | Lorteije et al. |
| 4,593,978 A | 6/1986 | Mourey et al. |
| 4,632,514 A | 12/1986 | Ogawa et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,781,438 A | 11/1988 | Noguchi |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Strathman |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,965,565 A | 10/1990 | Noguchi |
| 4,966,441 A | 10/1990 | Conner |

(Continued)

FOREIGN PATENT DOCUMENTS

DE 197 46 329 A1 3/1999

(Continued)

OTHER PUBLICATIONS

Adobe Systems, Inc., website, 2002, http://www.adobe.com/products/acrobat/cooltype.html.

(Continued)

*Primary Examiner*—Amare Mengistu
*Assistant Examiner*—Dmitriy Bolotin
(74) *Attorney, Agent, or Firm*—Innovation Counsel LLP

(57) ABSTRACT

Various embodiments of a sub-pixel repeating group are disclosed. In one embodiment, an octal subpixel repeating group may comprise three-color (red, green and blue) sub-pixels with blue colored subpixel comprising twice the number of positions within the octal sub-pixel grouping as the red and green colored sub-pixels. In another embodiment, a subpixel repeating group comprises two rows of eight "split" subpixels comprising three primary colors and a non-saturated neutral, or white, subpixel functioning as a primary color.

10 Claims, 27 Drawing Sheets

U.S. PATENT DOCUMENTS

| | | |
|---|---|---|
| 4,967,264 A | 10/1990 | Parulski et al. |
| 5,006,840 A | 4/1991 | Hamada et al. |
| 5,052,785 A | 10/1991 | Takimoto et al. |
| 5,083,853 A | 1/1992 | Ueki et al. |
| 5,113,274 A | 5/1992 | Takahashi et al. |
| 5,132,674 A | 7/1992 | Bottorf |
| 5,142,392 A | 8/1992 | Ueki et al. |
| 5,144,288 A | 9/1992 | Hamada et al. |
| 5,196,924 A | 3/1993 | Lumelsky et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,450,216 A | 9/1995 | Kasson |
| 5,461,503 A | 10/1995 | Deffontaines et al. |
| 5,477,240 A | 12/1995 | Huebner et al. |
| 5,485,293 A | 1/1996 | Robinder |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,648,793 A | 7/1997 | Chen |
| 5,754,163 A | 5/1998 | Kwon |
| 5,754,226 A | 5/1998 | Yamada et al. |
| 5,757,452 A | 5/1998 | Masaki et al. |
| 5,767,829 A | 6/1998 | Verhulst |
| 5,773,927 A | 6/1998 | Zimlich |
| 5,792,579 A | 8/1998 | Phillips |
| 5,815,101 A | 9/1998 | Fonte |
| 5,818,968 A | 10/1998 | Yoshimoto |
| 5,821,913 A | 10/1998 | Mamiya |
| 5,856,050 A | 1/1999 | Inoue et al. |
| 5,877,512 A | 3/1999 | Kim |
| 5,899,550 A | 5/1999 | Masaki |
| 5,917,556 A | 6/1999 | Katayama |
| 5,949,396 A | 9/1999 | Lee |
| 5,949,496 A | 9/1999 | Kim |
| 5,973,664 A | 10/1999 | Badger |
| 5,991,438 A | 11/1999 | Shaked et al. |
| 6,002,446 A | 12/1999 | Eglit |
| 6,005,582 A | 12/1999 | Gabriel et al. |
| 6,008,868 A | 12/1999 | Silverbrook |
| 6,023,315 A | 2/2000 | Harrold et al. |
| 6,034,666 A | 3/2000 | Kanai et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,069,670 A | 5/2000 | Borer |
| 6,072,272 A | 6/2000 | Rumbaugh |
| 6,072,445 A | 6/2000 | Spitzer et al. |
| 6,097,367 A | 8/2000 | Kuriwaki et al. |
| 6,108,122 A | 8/2000 | Ulrich et al. |
| 6,115,092 A | 9/2000 | Greene et al. |
| 6,137,560 A | 10/2000 | Utsumi et al. |
| 6,144,352 A | 11/2000 | Matsuda et al. |
| 6,160,535 A | 12/2000 | Park |
| 6,184,903 B1 | 2/2001 | Omori |
| 6,188,385 B1 | 2/2001 | Hill et al. |
| 6,191,681 B1 * | 2/2001 | Cole et al. ................ 338/22 R |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,271,891 B1 | 8/2001 | Ogawa et al. |
| 6,278,434 B1 | 8/2001 | Hill et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,342,876 B1 | 1/2002 | Kim |
| 6,348,929 B1 | 2/2002 | Acharya et al. |
| 6,360,023 B1 | 3/2002 | Betrisey et al. |
| 6,377,262 B1 | 4/2002 | Hitchcock et al. |
| 6,385,466 B1 | 5/2002 | Hirai et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,429,867 B1 | 8/2002 | Deering |
| 6,441,867 B1 | 8/2002 | Daly |
| 6,453,067 B1 | 9/2002 | Morgan et al. |
| 6,466,618 B1 | 10/2002 | Messing et al. |
| 6,469,756 B1 | 10/2002 | Booth, Jr. |
| 6,469,766 B2 | 10/2002 | Waterman et al. |
| 6,486,923 B1 | 11/2002 | Maeshima et al. |
| 6,545,740 B2 | 4/2003 | Werner |
| 6,552,706 B1 | 4/2003 | Ikeda et al. |
| 6,593,981 B1 | 7/2003 | Haim et al. |
| 6,600,495 B1 | 7/2003 | Boland et al. |
| 6,661,429 B1 | 12/2003 | Phan |
| 6,674,436 B1 | 1/2004 | Dresevic et al. |
| 6,680,761 B1 | 1/2004 | Greene et al. |
| 6,681,053 B1 | 1/2004 | Zhu |
| 6,714,206 B1 | 3/2004 | Martin et al. |
| 6,727,878 B2 | 4/2004 | Okuono et al. |
| 6,738,526 B1 | 5/2004 | Betrisey et al. |
| 6,750,875 B1 | 6/2004 | Keely, Jr. et al. |
| 6,781,626 B1 | 8/2004 | Wang |
| 6,801,220 B2 | 10/2004 | Greier et al. |
| 6,804,407 B2 | 10/2004 | Weldy |
| 6,833,890 B2 | 12/2004 | Hong et al. |
| 6,836,300 B2 | 12/2004 | Choo et al. |
| 6,842,207 B2 | 1/2005 | Nishida et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,754 B2 | 6/2005 | Brown Elliott |
| 6,914,649 B2 | 7/2005 | Liu |
| 6,927,754 B2 | 8/2005 | Lai |
| 6,930,676 B2 | 8/2005 | De Haan et al. |
| 6,937,217 B2 | 8/2005 | Klompenhouwer et al. |
| 6,950,156 B1 | 9/2005 | Yoshida |
| 6,989,876 B2 | 1/2006 | Song et al. |
| 7,110,012 B2 | 9/2006 | Messing et al. |
| 7,123,277 B2 | 10/2006 | Brown Elliott et al. |
| 7,129,955 B2 | 10/2006 | Motomura |
| 7,167,186 B2 | 1/2007 | Credelle et al. |
| 7,184,066 B2 | 2/2007 | Elliot et al. |
| 7,187,353 B2 | 3/2007 | Credelle et al. |
| 7,221,381 B2 | 5/2007 | Brown et al. |
| 7,564,530 B2 * | 7/2009 | Hu et al. ................ 349/143 |
| 7,636,076 B2 * | 12/2009 | Hung et al. ................ 345/88 |
| 2001/0015716 A1 | 8/2001 | Kim |
| 2001/0017607 A1 | 8/2001 | Kwon et al. |
| 2001/0045925 A1 * | 11/2001 | Libsch et al. ................ 345/87 |
| 2001/0048764 A1 | 12/2001 | Betrisey et al. |
| 2001/0052897 A1 | 12/2001 | Nakano et al. |
| 2002/0030780 A1 | 3/2002 | Nishida et al. |
| 2002/0054263 A1 | 5/2002 | Kim et al. |
| 2002/0093476 A1 | 7/2002 | Hill et al. |
| 2002/0149598 A1 | 10/2002 | Greier et al. |
| 2002/0186214 A1 * | 12/2002 | Siwinski ................ 345/212 |
| 2002/0190648 A1 | 12/2002 | Bechtel et al. |

| | | | |
|---|---|---|---|
| 2003/0016310 A1 | 1/2003 | Lee et al. | |
| 2003/0034992 A1 | 2/2003 | Brown Elliott et al. | |
| 2003/0071775 A1 | 4/2003 | Ohashi et al. | |
| 2003/0072374 A1 | 4/2003 | Sohm | |
| 2003/0077000 A1 | 4/2003 | Blinn et al. | |
| 2003/0085906 A1 | 5/2003 | Elliott et al. | |
| 2003/0090581 A1 | 5/2003 | Credelle et al. | |
| 2003/0103058 A1 | 6/2003 | Elliott et al. | |
| 2003/0117423 A1 | 6/2003 | Brown Elliott | |
| 2003/0128179 A1 | 7/2003 | Credelle | |
| 2003/0128225 A1 | 7/2003 | Credelle et al. | |
| 2003/0218618 A1 | 11/2003 | Phan | |
| 2004/0021804 A1 | 2/2004 | Hong et al. | |
| 2004/0051724 A1 | 3/2004 | Elliott et al. | |
| 2004/0061710 A1 | 4/2004 | Messing et al. | |
| 2004/0075764 A1 | 4/2004 | Law et al. | |
| 2004/0080479 A1 | 4/2004 | Credelle | |
| 2004/0085495 A1 | 5/2004 | Roh et al. | |
| 2004/0095521 A1 | 5/2004 | Song et al. | |
| 2004/0104873 A1 | 6/2004 | Kang et al. | |
| 2004/0108818 A1 | 6/2004 | Cok et al. | |
| 2004/0114046 A1 | 6/2004 | Lee et al. | |
| 2004/0150651 A1 | 8/2004 | Phan | |
| 2004/0169807 A1 | 9/2004 | Rho et al. | |
| 2004/0174380 A1 | 9/2004 | Credelle et al. | |
| 2004/0174389 A1 | 9/2004 | Ben-David et al. | |
| 2004/0179160 A1 | 9/2004 | Rhee et al. | |
| 2004/0195963 A1 | 10/2004 | Choi et al. | |
| 2004/0239813 A1 | 12/2004 | Klompenhouwer | |
| 2004/0239837 A1 | 12/2004 | Hong et al. | |
| 2004/0246213 A1 | 12/2004 | Credelle et al. | |
| 2004/0246279 A1 | 12/2004 | Credelle et al. | |
| 2004/0263528 A1 | 12/2004 | Murdoch et al. | |
| 2005/0001856 A1 | 1/2005 | Sparre et al. | |
| 2005/0007327 A1 | 1/2005 | Elion et al. | |
| 2005/0024380 A1 | 2/2005 | Lin et al. | |
| 2005/0068477 A1 | 3/2005 | Shin et al. | |
| 2005/0083356 A1 | 4/2005 | Roh et al. | |
| 2005/0094871 A1 | 5/2005 | Berns et al. | |
| 2005/0099426 A1 | 5/2005 | Primerano et al. | |
| 2005/0134785 A1* | 6/2005 | Roth et al. | 349/144 |
| 2005/0140634 A1 | 6/2005 | Takatori | |
| 2005/0151752 A1 | 7/2005 | Phan | |
| 2005/0162600 A1 | 7/2005 | Rho et al. | |
| 2005/0169551 A1 | 8/2005 | Messing et al. | |
| 2005/0225574 A1 | 10/2005 | Brown et al. | |
| 2005/0225575 A1 | 10/2005 | Brown et al. | |
| 2007/0052887 A1 | 3/2007 | Brown Elliot et al. | |
| 2007/0057963 A1 | 3/2007 | Brown Elliot et al. | |
| 2007/0071352 A1 | 3/2007 | Brown Elliot et al. | |
| 2007/0086090 A1 | 4/2007 | Wang et al. | |

FOREIGN PATENT DOCUMENTS

| | | |
|---|---|---|
| DE | 199 23 527 | 11/2000 |
| DE | 199 23 527 A1 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 0671 650 | 9/1995 |
| EP | 0 793 214 A1 | 2/1996 |
| EP | 0 812 114 A1 | 12/1997 |
| EP | 0 878 969 | 11/1998 |
| EP | 0 899 604 A2 | 3/1999 |
| EP | 1 083 539 A2 | 3/2001 |
| EP | 1 261 014 A2 | 11/2002 |
| EP | 1 308 923 A1 | 5/2003 |
| GB | 2 133 912 A | 8/1984 |
| GB | 2 146 478 A | 4/1985 |
| GB | 2 282 928 A | 4/1995 |
| JP | 1984-111196 A | 6/1984 |
| JP | 60-107022 | 6/1985 |
| JP | 62 127716 | 6/1987 |
| JP | 02-000826 A | 1/1990 |
| JP | 02-504324 | 12/1990 |
| JP | 03-78390 | 4/1991 |
| JP | 03-036239 B | 5/1991 |
| JP | 03-269567 | 12/1991 |
| JP | 06-102503 | 4/1994 |
| JP | 06-214250 | 8/1994 |
| JP | 07-306656 | 11/1995 |
| JP | 09-120431 | 5/1997 |
| JP | 09-159992 | 6/1997 |
| JP | 11-014978 | 1/1999 |
| JP | 02-983027 B2 | 11/1999 |
| JP | 2004-004822 | 1/2004 |
| JP | 2004 078218 | 3/2004 |
| KR | 0259783 | 3/2000 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/67196 | 11/2000 |
| WO | WO 00/70392 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/11112 A2 | 2/2002 |
| WO | WO 02/059685 A2 | 8/2002 |
| WO | WO 03/014819 A1 | 2/2003 |
| WO | WO 03/050605 A1 | 2/2003 |
| WO | WO 03/056383 A1 | 7/2003 |
| WO | WO 2004/017129 A1 | 2/2004 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |
| WO | WO 2005/057532 A2 | 6/2005 |

OTHER PUBLICATIONS

Betrisey, C., et al., "Displaced Filtering for Patterned Displays," 2000, Society for Information Display (SID) 00 Digest, pp. 296-299.
Carvajal, D., "Big Publishers Looking Into Digital Books," Apr. 3, 2000, The New York Times, Business/Financial Desk.
Elliott, C., "Active Matrix Display Layout Optimization for Sub-pixel Image Rendering," Sep. 2000, Proceedings of the 1$^{st}$ International Display Manufacturing Conference, pp. 185-189.
Elliott, C., "New Pixel Layout for PenTile Matrix," Jan. 2002, Proceedings of the International Display Manufacturing Conference, pp. 115-117.
Elliott, C., "Reducing Pixel Count without Reducing Image Quality," Dec. 1999, Information Display, vol. 15, pp. 22-25.
Gibson Research Corporation, website, "Sub-Pixel Font Rendering Technology, How It Works," 2002, http://www.grc.com/ctwhat.html.
Martin, R., et al., "Detectability of Reduced Blue Pixel Count in Projection Displays," May 1993, Society for Information Display (SID) 93 Digest, pp. 606-609.
Microsoft Corporation, website, 2002, http://www.microsoft.com/reader/ppc/product/cleartype.html.
Microsoft Press Release, Nov. 15, 1998, Microsoft Research Announces Screen Display Breakthrough at COMDEX/Fall '98, PR Newswire.
Murch, M., "Visual Perception Basics," 1987, SID, Seminar 2, Tektronix, Inc., Beaverton, Oregon.
Okumura, H., et al., "A New Flicker-Reduction Drive Method for High-Resolution LCTVs," May 1991, Society for Information Display (SID) International Symposium Digest of Technical Papers, pp. 551-554.
Wandell, Brian A., Stanford University, "Fundamentals of Vision: Behavior, Neuroscience and Computation," Jun. 12, 1994, Society for Information Display (SID) Short Course S-2, Fairmont Hotel, San Jose, California.
U.S. Patent Application Publication No. US 2002/0015110 A1, Feb. 7, 2002, Brown Elliott.

Booth, Jr., Lawrence A., "Method and Apparatus for Wide Gamut Multicolor Display," U.S. Patent Application Publication, Publication No. US 2003/0011613 A1, Jan. 16, 2003.

"ClearType magnified," *Wired Magazine*, Nov. 8, 1999, Microsoft Typography, article posted Nov. 8, 1999, and last updated Jan. 27, 1999, © 1999 Microsoft Corporation, 1 page.

Credelle, Thomas L. et al., "P-00: MTF of High-Resolution PenTile Matrix™ Displays," *Eurodisplay 02 Digest*, 2002, pp. 1-4.

Daly, Scott, "Analysis of Subtriad Addressing Algorithms by Visual System Models," *SID Symp. Digest*, Jun. 2001, pp. 1200-1203.

Elliott, Candice H. Brown et al., "Color Subpixel Rendering Projectors and Flat Panel Displays," New Initiatives in Motion Imaging, SMPTE Advanced Motion Imaging Conference, Feb. 27-Mar. 1, 2003, Seattle, Washington, pp. 1-4.

Elliott, Candice H. Brown et al., "Co-optimization of Color AMLCD Subpixel Architecture and Rendering Algorithms," *SID Symp. Digest*, May 2002, pp. 172-175.

Feigenblatt, R.I., "Full-color imaging on amplitude-quantized color mosaic displays," *SPIE*, vol. 1075, Digital Image Processing Applications, 1989, pp. 199-204.

Hayashi, Kenkichi, "Image Signal Processing Device for Minimizing False Signals at Color Boundaries," U.S. Patent Application Publication, Publication No. US 2002/0140831 A1, Oct. 3, 2002.

Hoelen, Christoph Gerard August et al., "Light Panel with Enlarged Viewing Window," U.S. Patent Application Publication, Publication No. US 2003/0043567 A1, Mar. 6, 2003.

Johnston, Stuart J., "An Easy Read: Microsoft's ClearType," *InformationWeek Online, Redmond, WA*, Nov. 23, 1998, 3 pages.

Johnston, Stuart J., "Clarifying ClearType" *InformationWeek Online, Redmond, WA*, Jan. 4, 1999, 4 pages.

"Just Outta Beta," *Wired Magazine*, Dec. 1999, Issue 7.12, 3 pages.

Klompenhouwer, Michiel A. et al., "Subpixel Image Scaling for Color Matrix Displays," *SID Symp. Digest*, May 2002, pp. 176-179.

Kusunoki, Toshiaki et al., "Display Device Using Thin Film Cathode and Its Process," U.S. Patent Application Publication, Publication No. US 2001/0017515 A1, Aug. 30, 2001.

Markoff, John, "Microsoft's Cleartype Sets Off Debate on Originality," *The New York Times*, Dec. 7, 1998, 5 pages.

"Microsoft ClearType," http://www.microsoft.com/opentype/cleartype, Sep. 26, 2002, 4 pages.

Platt, John C., "Optimal Filtering for Patterned Displays," Microsoft Research, *IEEE Signal Processing Letters*, 2000, 4 pages.

Platt, John, "Technical Overview of ClearType Filtering," Microsoft Research, http://research.microsoft.com/users/jplatt/cleartype/default.aspx, Sep. 17, 2002, 3 pages.

Poor, Alfred, "LCDs: The 800-pound Gorilla," *Information Display*, Sep. 2002, pp. 18-21.

"Ron Feigenblatt's remarks on Microsoft ClearType®," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub-Pixel Font Rendering Technology," © 2003 Gibson Research Corporation, Laguna Hills, CA, 2 pages.

Werner, Ken, "OLEDs, OLEDs, Everywhere . . . ," *Information Display*, Sep. 2002, pp. 12-15.

Yamazaki, Shunpei, "Semiconductor Device and Manufacturing Method Thereof," U.S. Patent Application Publication, Publication No. US 2001/0040645 A1, Nov. 15, 2001.

Yamazaki, Shunpei et al., "Electro-Optical Device," U.S. Patent Application Publication, Publication No. US 2002/0017645 A1, Feb. 14, 2002.

Choo, Kyo Seop et al., "Data Wire Device of Pentile Matrix Display Device," U.S. Patent Application Publication, Pub. No. 2003/0071943 A1, Apr. 17, 2003.

Goertzen, Kenbe D., "System and Method for Optimizing Image Resolution Using Pixelated Imaging Device," U.S. Patent Application Publication, Pub. No. 2003/0071826 A1, Apr. 17, 2003.

Kunzman, Adam J., "Reduced Color Separation White Enhancement for Sequential Color Displays," U.S. Patent Application Publication, Pub. No. 2002/0122160 A1, Sep. 5, 2002.

Lee, Baek-woon et al., "40.5L: Late-News Paper: TFT-LCD with RGBW Color System," *SID 03 Digest*, 2003, pp. 1212-1215.

Sun, Xiuhong, "Multispectral Imaging System with Spatial Resolution Enhancement," U.S. Patent Application Publication, Pub. No. 2002/0012071 A1, Jan. 31, 2002.

USPTO, Non-Final Office Action, dated Mar. 9, 2004 in US Patent No. 6,903,754 (U.S. Appl. No. 09/916,232).

USPTO, Non-Final Office Action, dated May 6, 2004 in US Patent No. 6,903,754 (U.S. Appl. No. 09/916,232).

Clairvoyante Inc., Response to Non-Final Office Action, dated Sep. 3, 2004 in US Patent No. 6,903,754 (U.S. Appl. No. 09/916,232).

USPTO, Final Office Action, dated Jan. 6, 2005 in US Patent No. 6,903,754 (U.S. Appl. No.09/916,232).

Clairvoyante Inc., Response to Final Office Action, dated Jan. 28, 2005 in US Patent No. 6,903,754 (U.S. Appl. No. 09/916,232).

USPTO, Non-Final Office Action, dated Feb. 7, 2005 in US Patent Publication No. 2003/0034992 (U.S. Appl. No. 10/051,612).

Clairvoyante Inc, Response to Non-Final Office, dated Jul. 7, 2005 in US Patent Publication No. 2003/0034992 (U.S. Appl. No. 10/051,612).

USPTO, Final Office Action dated, Aug. 31, 2005 in US Patent Publication No. 2003/0034992 (U.S. Appl. No. 10/051,612).

Clairvoyante Inc, Response to Final Office, dated Sep. 19, 2005 in US Patent Publication No. 2003/0034992 (U.S. Appl. No. 10/051,612).

USPTO, Non-Final Office Action dated, Dec. 15, 2005 in US Patent Publication No. 2003/0034992 (U.S. Appl. No. 10/051,612).

Clairvoyante Inc, Response to Non-Final Office, dated Feb. 8, 2006 in US Patent Publication No. 2003/0034992 (U.S. Appl. No. 10/051,612).

USPTO, Notice of Allowance, dated May 4, 2006 in US Patent Publication No. 2003/0034992 (U.S. Appl. No. 10/051,612).

USPTO, Non-Final Office Action, dated Jul. 28, 2005 in US Patent Publication No. 2003/0090581, (U.S. Appl. No. 10/278,393).

Clairvoyante Inc, Response to Non-Final Office Action, dated Jan. 30, 2006 in US Patent Publication No. 2003/0090581, (U.S. Appl. No. 10/278,393).

USPTO, Final Office Action, dated Apr. 18, 2006 in US Patent Publication No. 2003/0090581, (U.S. Appl. No. 10/278,393).

Clairvoyante Inc, Response to Non-Final Office Action, dated Sep. 18, 2006 in US Patent Publication No. 2003/0090581, (U.S. Appl. No. 10/278,393).

USPTO, Non-Final Office Action, dated Nov. 14, 2006 in US Patent Publication No. 2003/0090581, (U.S. Appl. No. 10/278,393).

USPTO, Non-Final Office Action, dated May 4, 2005 in US Patent Publication No. 2003/0117423, (U.S. Appl. No. 10/278,328).

Clairvoyante Inc, Response to Non-Final Office Action, dated Nov. 3, 2005 in US Patent Publication No. 2003/0117423, (U.S. Appl. No. 10/278,328).

USPTO, Final Office Action, dated Feb. 17, 2006 in US Patent Publication No. 2003/0117423, (U.S. Appl. No. 10/278,328).

USPTO, Non-Final Office Action, dated Nov. 15, 2006 in US Patent Publication No. 2003/0117423, (U.S. Appl. No. 10/278,328).

USPTO, Interview Summary, dated Mar. 17, 2006 in US Patent Publication No. 2003/0117423, (U.S. Appl. No. 10/278,328).

Clairvoyante Inc, Response to Final Office Action, dated Aug. 16, 2006 in US Patent Publication No. 2003/0117423, (U.S. Appl. No. 10/278,328).

USPTO, Non-Final Office Action, dated Jun. 27, 2005 in US Patent Publication No. 2003/0103058, (U.S. Appl. No. 10/150,355).

Clairvoyante Inc, Response to Non-Final Office Action, dated Dec. 22, 2005 in US Patent Publication No. 2003/0103058, (U.S. Appl. No. 10/150,355).

USPTO, Final Office Action, dated Mar. 7, 2006 in US Patent Publication No. 2003/0103058, (U.S. Appl. No. 10/150,355).

Clairvoyante Inc, Response to Non-Final Office Action, dated Jul. 25, 2006 in US Patent Publication No. 2003/0103058, (U.S. Appl. No. 10/150,355).

USPTO, Non-Final Office Action, dated Mar. 24, 2005 in US Patent Publication No. 2003/0085906, (U.S. Appl. No. 10/215,843).

Clairvoyante Inc, Response to Non-Final Office Action, dated Sep. 26, 2005 in US Patent Publication No. 2003/0085906, (U.S. Appl. No. 10/215,843).

USPTO, Final Office Action, dated Jan. 25, 2006 in US Patent Publication No. 2003/0085906, (U.S. Appl. No. 10/215,843).

Clairvoyante Inc, Response to Non-Final Office Action, dated Jun. 26, 2006 in US Patent Publication No. 2003/0085906, (U.S. Appl. No. 10/215,843).
USPTO, Notice of Allowance, dated Jul. 16, 2006 in US Patent Publication No. 2003/0085906, (U.S. Appl. No. 10/215,843).
USPTO, Non-Final Office Action, dated May 17, 2005 in US Patent Publication No. 2004/0051724, (U.S. Appl. No. 10/243,094).
Clairvoyante Inc, Response to Non-Final Office Action, dated Nov. 17, 2005 in US Patent Publication No. 2004/0051724, (U.S. Appl. No. 10/243,094).
USPTO, Final Office Action, dated Mar. 8, 2006 in US Patent Publication No. 2004/0051724, (U.S. Appl. No. 10/243,094).
USPTO, Non-Final Office Action, dated Nov. 16, 2004 in US Patent Publication No. 2003/0128225, (U.S. Appl. No. 10/278,353).
Clairvoyante Inc, Response to Non-Final Office Action, dated Apr. 15, 2005 in US Patent Publication No. 2003/0128225, (U.S. Appl. No. 10/278,353).
USPTO, Non-Final Office Action, dated Jul. 12, 2005 in US Patent Publication No. 2003/0128225, (U.S. Appl. No. 10/278,353).
Clairvoyante Inc, Response to Non-Final Office Action, dated Jan. 12, 2006 in US Patent Publication No. 2003/0128225, (U.S. Appl. No. 10/278,353).
USPTO, Final Office Action, dated Apr. 18, 2006 in US Patent Publication No. 2003/0128225, (U.S. Appl. No. 10/278,353).
Clairvoyante Inc, Response to Final Office Action, dated Sep. 18, 2006 in US Patent Publication No. 2003/0128225, (U.S. Appl. No. 10/278,353).
USPTO, Non-Final Office Action, dated Oct. 26, 2004 in US Patent Publication No. 2004/0174380 (U.S. Appl. No. 10/379,765).
Clairvoyante Inc, Response to Non-Final Office Action, dated Jan. 24, 2005 in US Patent Publication No. 2004/0174380 (U.S. Appl. No. 10/379,765).
USPTO, Final Office Action, dated Jun. 2, 2005 in US Patent Publication No. 2004/0174380 (U.S. Appl. No. 10/379,765).
USPTO, Non-Final Office Action, dated Nov. 2, 2005 in US Patent Publication No. 2004(0174380 (U.S. Appl. No. 10/379,765).
Clairvoyante Inc, Response to Non-Final Office Action, dated Apr. 10, 2006 in US Patent Publication No. 2004/0174380 (U.S. Appl. No. 10/379,765).
USPTO, Notice of Allowance, dated Jul. 26, 2006 in US Patent Publication No. 2004/0174380 (U.S. Appl. No. 10/379,765).
Brown Elliott, C, "Development of the PenTile Matrix™ Color AMLCD Subpixel Architecture and Rendering Algorithms", SID 2003, Journal Article.
Brown Elliott, C, "Pentile Matrix™ Displays and Drivers" ADEAC Proceedings Paper, Portland OR., Oct. 2005.
Krantz, John et al., Color Matrix Display Image Quality: The Effects of Luminance . . . SID 90 Digest, pp. 29-32.
Messing, Dean et al., Improved Display Resolution of Subsampled Colour Images Using Subpixel Addressing, IEEE ICIP 2002, vol. 1, pp. 625-628.
Messing, Dean et al., Subpixel Rendering on Non-Striped Colour Matrix Displays, 2003 International Conf on Image Processing, Sep. 2003, Barcelona, Spain, 4 pages.
PCT International Search Report dated Jun. 3, 2002 for PCT/US02/12610 (U.S. Appl. No. 10/051,612).
PCT International Search Report dated Jul. 17, 2003 for PCT/US02/39859 (U.S. Appl. No. 10/278,393).
PCT International Search Report dated Jul. 30, 2003 for PCT/US02/39860 (U.S. Appl. No. 10/278,328).
PCT International Search Report dated Sep. 30, 2003 for PCT/US02/24994 (U.S. Appl. No. 10/215,843).
PCT International Search Report dated Jun. 14, 2004 for PCT/US03/028222 (U.S. Appl. No. 10/243,094).
PCT International Search Report dated Nov. 3, 2004 for PCT/USO4/18036 (U.S. Appl. No. 10/696,236).
USPTO, Notice of Allowance, dated Feb. 7, 2005 in US Patent No. 6,903,754 (U.S. Appl. No. 09/916,232).
USPTO, Notice of Allowance, dated Nov. 30, 2006 in US Patent Publication No. 2003/0103058, (U.S. Appl. No. 10/150,355).
USPTO, Non-Final Office Action, dated Mar. 2, 2007 in US Patent Publication No. 2003/0128225, (U.S. Appl. No. 10/278,353).

USPTO, Non-Final Office Action, dated Nov. 16, 2004 in US Patent Publication No. 2003/0128179, (U.S. Appl. No. 10/278,352).
Clairvoyante Inc, Response to Non-Final Office Action, dated Apr. 15, 2005 in US Patent Publication No. 2003/0128179, (U.S. Appl. No. 10/278,352).
USPTO, Non-Final Office Action, dated Jul. 12, 2005 in US Patent Publication No. 2003/0128179, (U.S. Appl. No. 10/278,352).
Clairvoyante Inc, Response to Non-Final Office Action, dated Jan. 12, 2006 in US Patent Publication No. 2003/0128179, (U.S. Appl. No. 10/278,352).
USPTO, Final Office Action, dated Sep. 18, 2006 in US Patent Publication No. 2003/0128179, (U.S. Appl. No. 10/278,352).
Clairvoyante Inc, Response to Final Office Action, dated Dec. 6, 2006 in US Patent Publication No. 2003/0128179, U.S. Appl. No. 10/278,352).
USPTO, Non-Final Office Action dated May 4, 2006 in US Patent Publication No. 2005/0083277 (U.S. Appl. No. 10/696,236).
Clairvoyante Inc, Response to Non-Final Office Action dated Aug. 4, 2006 in US Patent Publication No. 2005/0083277 (U.S. Appl. No. 10/696,236).
USPTO, Final Office Action dated Oct. 17, 2006 in US Patent Publication No. 2005/0083277 (U.S. Appl. No. 10/696,236).
Clairvoyante Inc, Response to Final Office Action dated Mar. 16, 2007 in US Patent Publication No. 2005/0083277 (U.S. Appl. No. 10/696,236).
PCT International Search Report dated Dec. 9, 2005 for PCT/USO4/18034 (U.S. Appl. No. 10/455,925).
PCT International Search Report dated Jan. 10, 2006 for PCT/USO4/18035 (U.S. Appl. No. 10/456,806).
PCT International Search Report dated Dec. 23, 2005 for PCT/US05/010023 (U.S. Appl. No. 10/961,506).
Clairvoyante Inc, Response to Non-Final Office Action, dated May 14, 2007 in US Patent Publication No. 2003/0090581, (U.S. Appl. No. 10/278,393).
USPTO, Notice of Allowance, dated Jul. 17, 2007 in US Patent Publication No. 2003/0090581, (U.S. Appl. No. 10/278,393).
Clairvoyante Inc, Response to Non-Final Office Action, dated Jun. 12, 2007 in US Patent Publication No. 2003/0128225, (U.S. Appl. No. 10/278,353).
USPTO, Non-Final Office Action, dated Jun. 27, 2007 in US Patent Publication No. 2003/0128179, (U.S. Appl. No. 10/278,352).
USPTO, Non-Final Office Action dated Oct. 26, 2005 in US Patent Publication No. 2004/0246213 (U.S. Appl. No. 10/455,925).
Clairvoyante, Inc, Repsonse to Non-Final Office Action dated Apr. 26, 2006 in US Patent Publication No. 2004/0246213 (U.S. Appl. No. 10/455,925).
USPTO, Final Office Action dated Jun. 14, 2006 in US Patent Publication No. 2004/0246213 (U.S. Appl. No. 10/455,925).
Clairvoyante, Inc, Repsonse to Final Office Action dated Nov. 10, 2006 in US Patent Publication No. 2004/0246213 (U.S. Appl. No. 10/455,925).
USPTO, non-Final Office Action dated Feb. 14, 2007 in US Patent Publication No. 2004/0246213 (U.S. Appl. No. 10/455,925).
Clairvoyante, Inc, Repsonse to Non-Final Office Action dated Jul. 13, 2007 in US Patent Publication No. 2004/0246213 (U.S. Appl. No. 10/455,925).
USPTO, Non-Final Office Action dated Oct. 19, 2005 in US Patent No. 7,187,353 (U.S. Appl. No. 10/456,806).
Clairvoyante Inc, Response to Non-Final Office Action dated Feb. 21, 2005 in US Patent No. 7,187,353 (U.S. Appl. No. 10/456,806).
USPTO, Final Office Action dated May 2, 2006 in US Patent No. 7,187,353 (U.S. Appl. No. 10/456,806).
Clairvoyante Inc, Response to Final Office Action dated Aug. 2, 2006 in US Patent No. 7,187,353 (U.S. Appl. No. 10/456,806).
USPTO, Notice of Allowance, dated Sep. 18, 2006 in US Patent No. 7,187,353 (U.S. Appl. No. 10/456,806).
USPTO, Non-Final Office Action dated May 23, 2007 in US Patent Publication No. 2005/0083277 (U.S. Appl. No. 10/696,236).
USPTO, Non-Final Office Action dated Jul. 12, 2007 in US Patent Publication No. 2005/0225574 (U.S. Appl. No. 10/821,353).

* cited by examiner

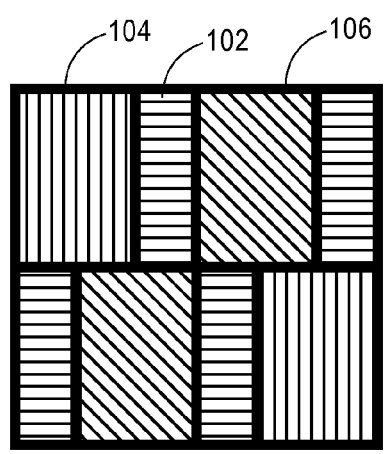 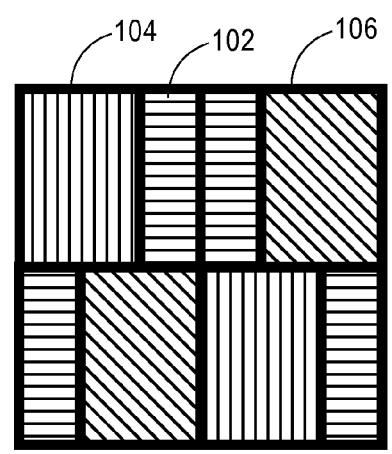
FIG. 19A  FIG. 19B

COLOR FLAT PANEL DISPLAY SUB-PIXEL RENDERING AND DRIVER CONFIGURATION FOR SUB-PIXEL ARRANGEMENTS WITH SPLIT SUB-PIXELS

This application is a continuation in part of co-pending U.S. patent application Ser. No. 10/278,352 filed on Oct. 22, 2002, and claims the benefit of priority thereof. This application is also a continuation in part of co-pending U.S. patent application Ser. No. 10/821,353 filed on Apr. 9, 2004, and claims the benefit of priority thereof. U.S. patent application Ser. No. 10/278,352 claims priority to U.S. Provisional Patent Application Ser. No. 60/346,738 ("the '738 provisional application"), filed on Jan. 7, 2002, which is hereby incorporated by reference herein.

U.S. patent application Ser. No. 10/278,352 is published as U.S. Patent Application Publication 2003/0128179, which is hereby incorporated by reference herein. U.S. patent application Ser. No. 10/821,353 is published as U.S. 2005/0225574, which is hereby incorporated by reference herein.

RELATED APPLICATIONS

The present application is also related to commonly owned U.S. patent application Ser. No. 10/278,328, entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed on Oct. 22, 2002, published as U.S. Patent Application Publication 2003/0117423 ("the '423 application"); U.S. patent application Ser. No. 10/278,393, entitled "COLOR DISPLAY HAVING HORIZONTAL SUB-PIXEL ARRANGEMENTS AND LAYOUTS," filed on Oct. 22, 2002, published as U.S. Patent Application Publication 2003/0090581 (the "581 application"); and U.S. patent application Ser. No. 10/278,353, entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed on Oct. 22, 2202, published as U.S. Patent Application Publication 2003/0128225. Published patent applications U.S. 2003/0128179, U.S. 2003/0117423, U.S. 2003/0090581 and U.S. 2003/0128225 are all hereby incorporated by reference herein.

BACKGROUND

The present application relates to improvements to display subpixel layouts, and, more particularly, to improved color subpixel arrangements, means of addressing used in displays, and to data format conversion methods for these displays.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chrominance, and motion. Motion is only important for flicker threshold to the imaging system designer. The luminance channel takes the input from only the red and green receptors. In other words, the luminance channel is "color blind." It processes the information in such a manner that the contrast of edges is enhanced. The chrominance channel does not have edge contrast enhancement. Since the luminance channel uses and enhances every red and green receptor, the resolution of the luminance channel is several times higher than the chrominance channels. Consequently, the blue receptor contribution to luminance perception is negligible. The luminance channel thus acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the horizontal axis is slightly higher than the vertical axis. The limit in the diagonal axes is significantly lower.

The chrominance channel is further subdivided into two sub-channels, to allow us to see full color. These channels are quite different from the luminance channel, acting as low pass filters. One can always tell what color an object is, no matter how big it is in our field of view. The red/green chrominance sub-channel resolution limit is at 8 cycles/°, while the yellow/blue chrominance sub-channel resolution limit is at 4 cycles/°. Thus, the error introduced by lowering the red/green resolution or the yellow/blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270μ) on a display. Thus, if the blue pixel pitch is less than half (625μ) of this blending pitch, the colors will blend without loss of picture quality. This blending effect is directly related to the chrominance sub-channel resolution limits described above. Below the resolution limit, one sees separate colors, above the resolution limit, one sees the combined color.

BRIEF DESCRIPTION OF THE DRAWINGS

The accompanying drawings, which are incorporated in, and constitute a part of this specification illustrate various implementations and embodiments.

FIGS. 19A and 19B show yet other embodiments of the octal subpixel arrangement of various displacements of the split majority subpixel within the subpixel grouping.

DETAILED DESCRIPTION

Reference will now be made in detail to various implementations and embodiments, examples of which are illustrated in the accompanying drawings. Wherever possible, the same reference numbers will be used throughout the drawings to refer to the same or like parts.

Display Panel Comprising Subpixel Repeating Group With "Split Blue" Subpixels

Figure 1:
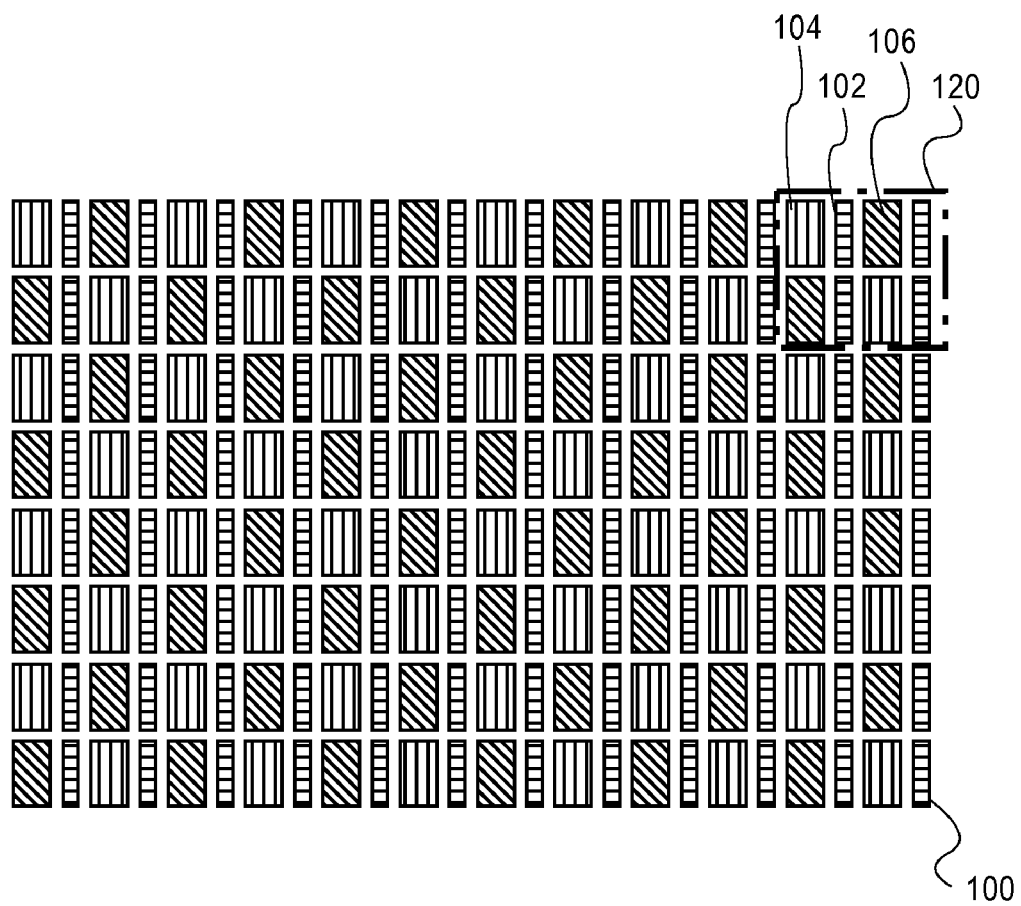
FIG. 1 shows an arrangement of sub-pixel emitters comprising three colors—red, green, and blue—in a grouping that creates a larger rectilinearly repeating cell group of eight sub-pixels wherein the blue sub-pixels are "split".

In FIG. 1, in the arrangement of sub-pixel emitters 100, there are sub-pixel emitters in three colors in grouping 120 that create a larger rectilinearly repeating cell group of eight sub-pixels. This layout was introduced in the '738 provisional application and included herein by reference. Grouping 120 comprises red sub-pixels 104 illustrated by vertical cross-hatching, green sub-pixels 106 illustrated by diagonal cross-hatching, and blue sub-pixels 102 illustrated by horizontal cross-hatching. As may be seen, blue sub-pixels 102 are "split"—i.e. having a smaller width along the horizontal axis than either red or green sub-pixels but doubled in number per grouping or repeat cell. Such a "split" sub-pixel can refer to a sub-pixel having a smaller area than a non-split sub-pixel. Splitting the blue sub-pixels helps in breaking up the noticeable effect of visible vertical blue stripes down the display, as further discussed in the related '423 application referenced above.

As may additionally be seen in FIG. 1, the red and the green sub-pixels are placed upon a "checkerboard" pattern within the repeat cell itself. As discussed further in related US Patent Application Publication 2003/0128225 referenced above, it may be desirable to alter the color assignments in repeat cell grouping 120 to have split green sub-pixels in the positions of sub-pixels 102 and have the remaining red and blue sub-pixels form the checkerboard pattern. Likewise, it might be desirable to have the red sub-pixels split and the green and blue sub-pixels on a checkerboard pattern. The alternating "checkerboard" of emitters is similar to the red and green "checkerboard" that was disclosed in commonly assigned U.S. patent application Ser. No. 09/916,232, entitled "ARRANGEMENT OF COLOR PIXELS FOR FULL COLOR IMAGING DEVICES WITH SIMPLIFIED ADDRESSING," filed on Jul. 25, 2001, and now issued as U.S. Pat No. 6,903,754 ("the '754application"). U.S. Pat. No. 6,903,754 which is hereby incorporated herein by reference.

It should be appreciate that while FIG. 1 depicts the "split" blue subpixel as narrower than either the red or the green subpixels, another embodiment of the present invention employs blue subpixels of equal area dimensions to the red and green subpixels. To achieve a pleasing white point with all subpixels on in a logical pixel, the relative intensities (luminance) of the red, green and blue emitters may be changed appropriately, as discussed in co-pending and commonly assigned U.S. patent application Ser. No. 10/243,094, entitled "IMPROVED FOUR COLOR ARRANGEMENTS OF EMITTERS FOR SUB-PIXEL RENDERING," filed Sep. 13, 2002, and published as U.S. Patent Publication No. 2004/0051724. U.S. Patent Publication No. 2004/0051724 ("the '724 application") is hereby incorporated by reference herein. For example, in the '724 application, several techniques are discussed for adjusting the red and green subpixels to be of equal luminance. One embodiment comprises keeping the same chromaticity points but increase the transmission of the lower luminance filter. There are several ways to accomplish this result: (1) make the red filter physically thinner than the green filter; (2) change the red pigment to either (a) reduce the amount of pigment in the filter; or (b) apply a different pigment comprising the same chromaticity but allows for greater transmissivity of light; or (3) apply a red filter that maintains substantially the same center of chromaticity but broadens the range of frequencies on either side of the center point.

Another embodiment would keep the same chromaticity point but decrease the transmission of the higher luminance filter. As above, there are several ways to accomplish this result: (1) make the green filter physically thicker than the red filter; (2) change the green pigment to either (a) increase the amount of pigment; or (b) apply a different pigment comprising the same chromaticity but allows for a lesser transmissivity of light; or (3) apply a green filter that maintains substantially the same center of chromaticity but narrows the range of frequencies passed through on either side of the center point.

Another embodiment may be to increase the energy from the backlight of the transmissive panel (e.g. LCD) in the pass band of the lower luminance color filter relative to the higher luminance color filter pass band.

As shown in FIG. 1, the subpixels appear to have a substantially rectangular appearance. It should be appreciated that other shapes to the subpixels are also possible and are contemplated within the scope of the present invention. For example, a multitude of other regular or irregular shapes for the subpixels are possible and are desirable if manufacturable. It suffices only that there is an octal grouping of colored subpixels in the fashion herein described that may be addressable for the purposes of subpixel rendering (SPR).

Figure 18A:
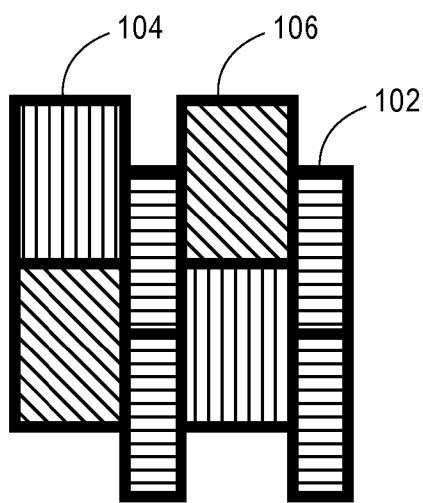
FIGS. 18A and 18B show other embodiments of the octal subpixel arrangement with various vertical displacements of the subpixels.
Figure 18B:
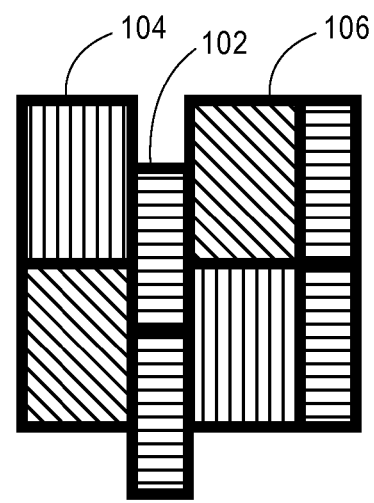

As subpixel shapes may vary under the scope of the present invention, so too may the exact positions of the subpixels be varied under the scope of the present invention. For example, FIGS. 18A and 18B depict a similar octal subpixel grouping wherein one or both of the majority stripes 102 are offset (relatively or otherwise) from the other subpixels 104 and 106. Other vertical offsets are also possible.

Other embodiments of the octal groupings are also possible. FIGS. 19A and 19B depict octal groupings wherein the majority subpixels 102 are interspersed within the checkerboard of subpixels 104 and 106. Other arrangements of majority subpixel placement within such a checkerboard are also possible and are contemplated within the scope of the present invention.

FIGS. 19A and 19B may have column electrodes that zigzag across the display. Column driver savings should be one third when compared to the RGB stripe system with the same resolution and the number of subpixels are about two thirds of the number of subpixels when compared to the RGB stripe system.

Yet other embodiments of the present invention are possible. For example, the entire octal subpixel groupings may be rotated 90 degrees to reverse the roles of row and column driver connections to the grouping. Such a horizontal arrangement for subpixels is further disclosed in the related, co-pending and commonly assigned '581 application referenced above.

Subpixel Rendering Techniques for Subpixel Repeating Groups With "split blue" Subpixels With the display comprised substantially of repeat cell 120 having the blue sub-pixel split as sub-pixel 102, it is possible to perform sub-pixel rendering upon this display using the area resampling techniques as described in commonly-owned U.S. patent application Ser. No. 10/150,355, entitled "METHODS AND SYSTEMS FOR SUB-PIXEL RENDERING WITH GAMMA ADJUSTMENT," filed on May 17, 2002, and published as United States Patent Publication No. 2003/0103058 ("the '058application"), now issued as U.S. Pat. No. 7,221,381, United States Patent Publication No. 2003/0103058 is hereby incorporated by reference herein. One such embodiment of area resampling is shown in FIGS. 2 through 7.

Figure 2:
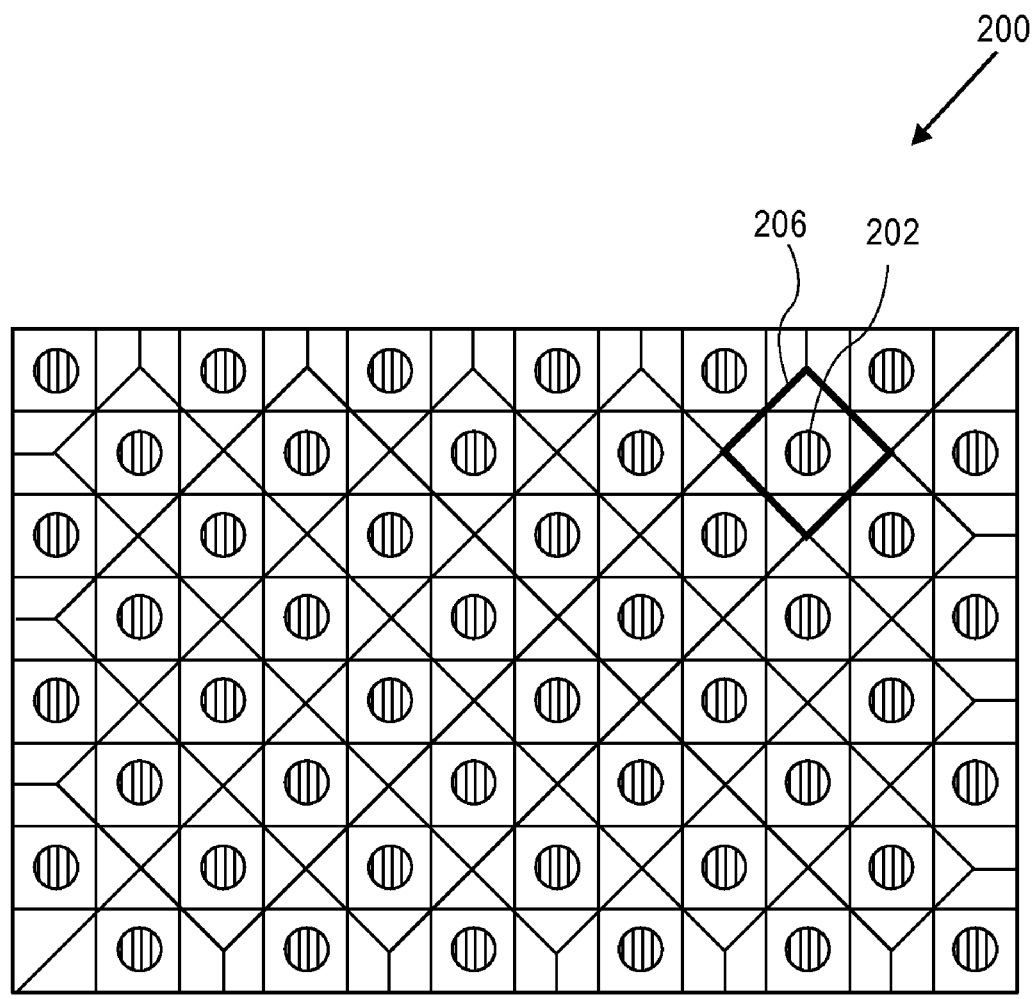
FIGS. 2, 3 and 4 illustrate one embodiment of red, green, and blue resample area arrays for the red, green and blue color planes respectively to match the sub-pixel arrangement of FIG. 1.
Figure 3:
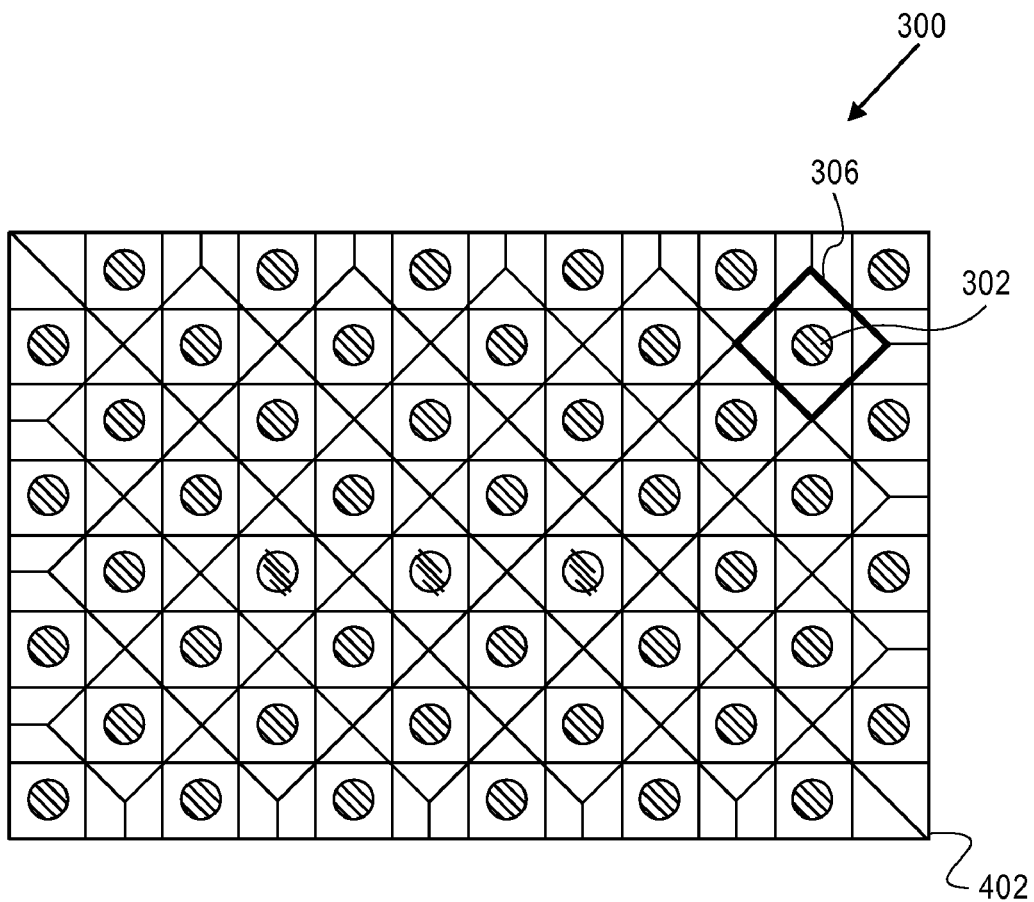
Figure 4:
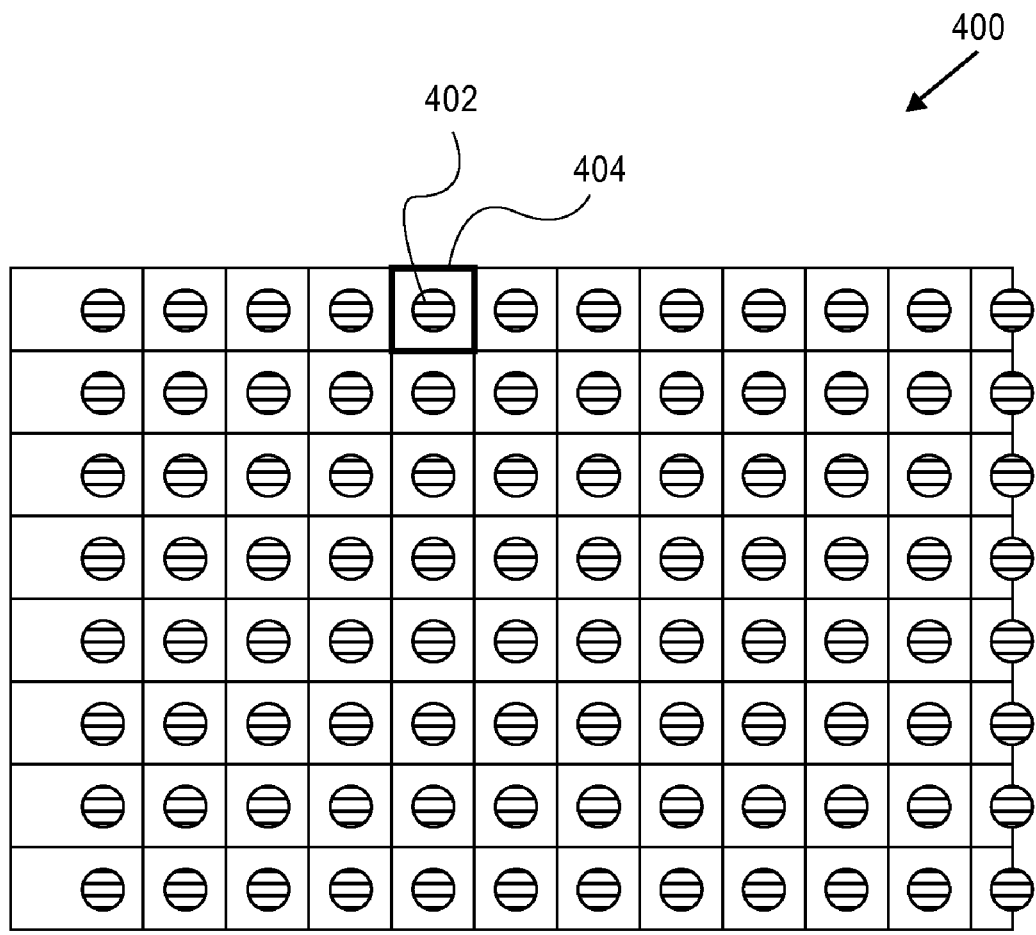

FIGS. 2, 3 and 4 illustrate red 200, green 300, and blue 400 resample area arrays for the red, green and blue color planes, respectively. Each color resample area array 200, 300, and 400 comprises resample areas 206, 306 and 404, respectively, and that each resample area has an associated resample point 202, 302 and 402, respectively. The resample points 202, 302, and 402 match the relative positions of the red 104, green 106 and blue 102 sub-pixel locations, respectively, within each color plane; but not necessarily their exact inter-color-plane-phase relationships. Any number of phase relationships are possible, a number of which have useful properties in given data format conversion cases.

Figure 5:
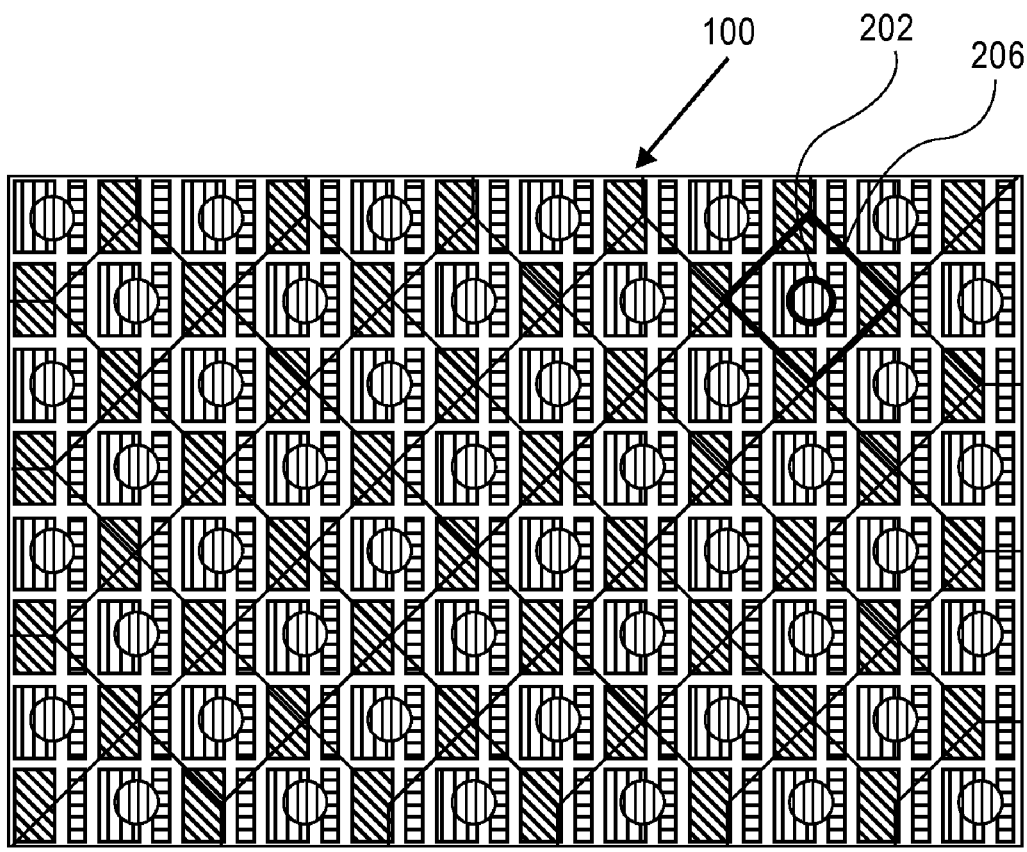
FIGS. 5 and 6 illustrate the red and green resample area arrays of FIGS. 2 and 3 overlaid on the sub-pixel arrangement of FIG. 1 respectively.
Figure 6:
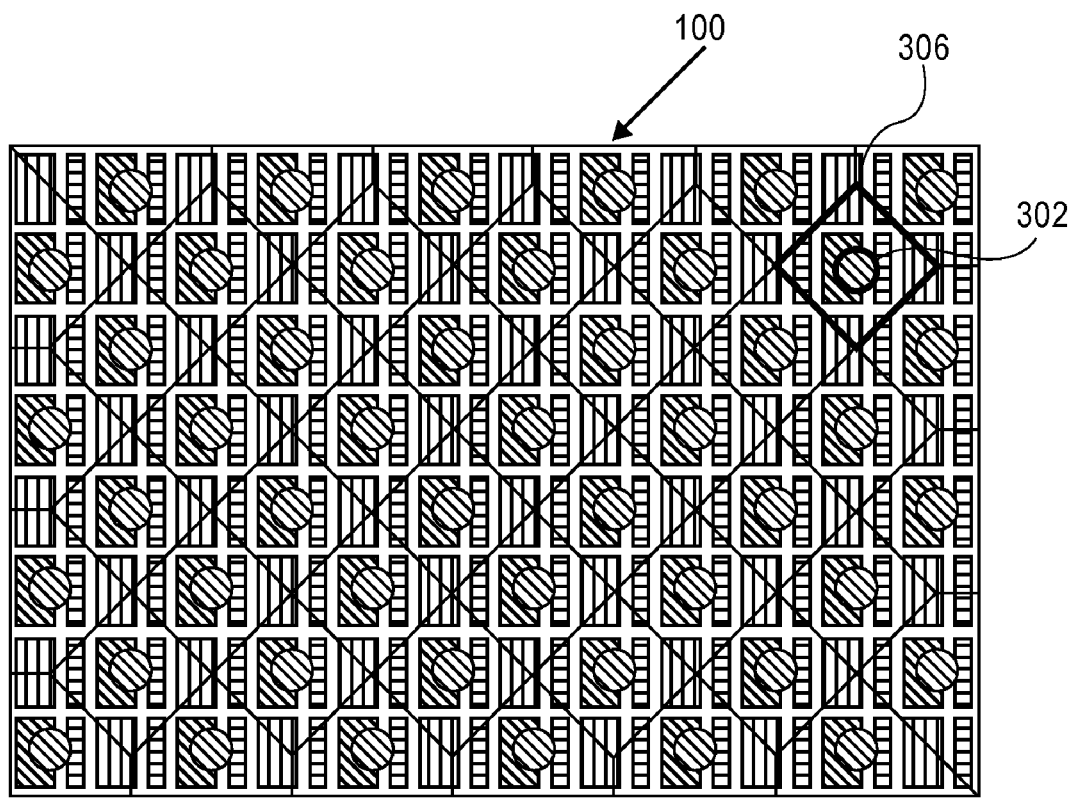
Figure 7:
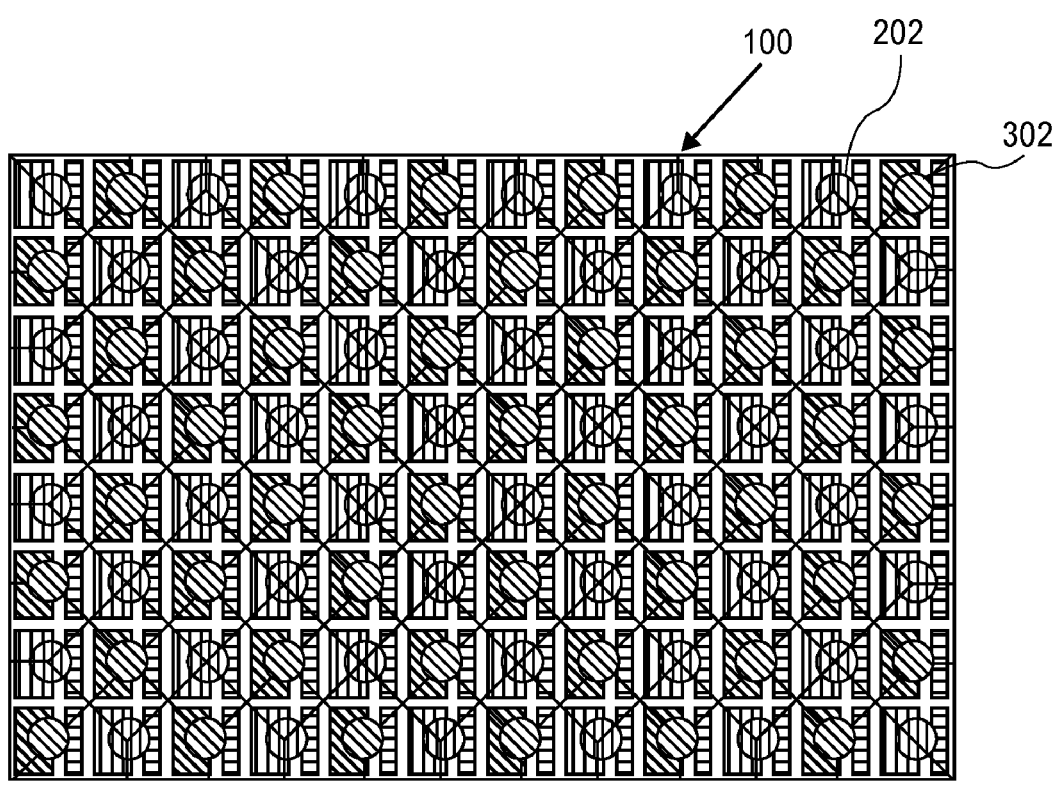
FIG. 7 illustrates one particular inter-color-plane-phase relationship between the red and green color resample areas overlaid on the sub-pixel arrangement of FIG. 1.

FIG. 5 illustrates red resample area array 200 of FIG. 2 overlaid on the sub-pixel arrangement 100 of FIG. 1. FIG. 6 illustrates the green resample area array 300 of FIG. 3 overlaid on the sub-pixel arrangement 100 of FIG. 1. FIG. 7 illustrates one particular inter-color-plane-phase relationship between red color resample area array 200 and green color resample area array 300 when both arrays are overlaid on the sub-pixel arrangement 100. This particular inter-color-plane-phase relationship depicts converting the conventional fully converged square grid red-green-blue RGB format which is to be displayed "one-to-one" with the square blue 102 sub-pixel grid. In this inter-color-plane-phase relationship, the green resample area array 300 of FIG. 3, blue resample area array 400 of FIG. 4, and red resample area array 200 of FIG. 2 are positioned such that the red resample points 202 and green resample points 302 overlap the blue resample points 402 (which are not called out in FIG. 7). This treats the blue sub-pixels 102 as though they lay on top of, or are intimately associated with, the red and green sub-pixel checkerboard.

Figure 11:
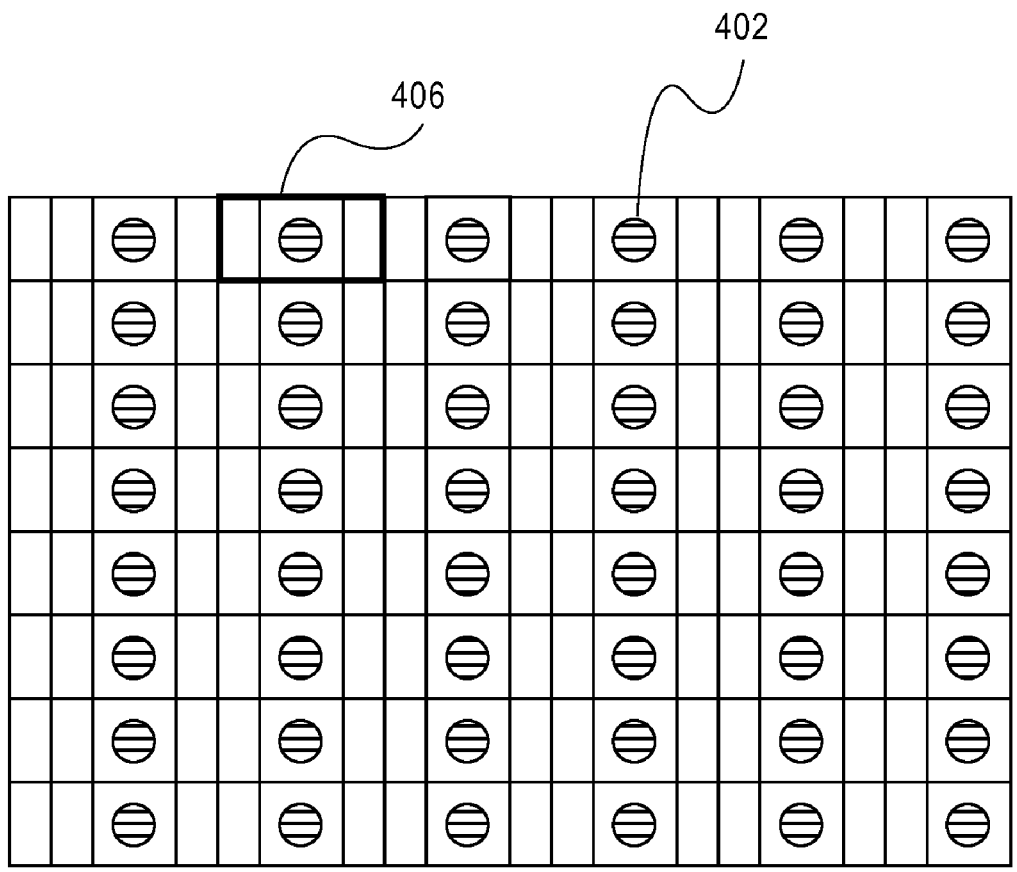
FIGS. 11 and 13 each depict an alternative blue color plane resample area array that may be used in place of the one shown in FIG. 4.
Figure 12:
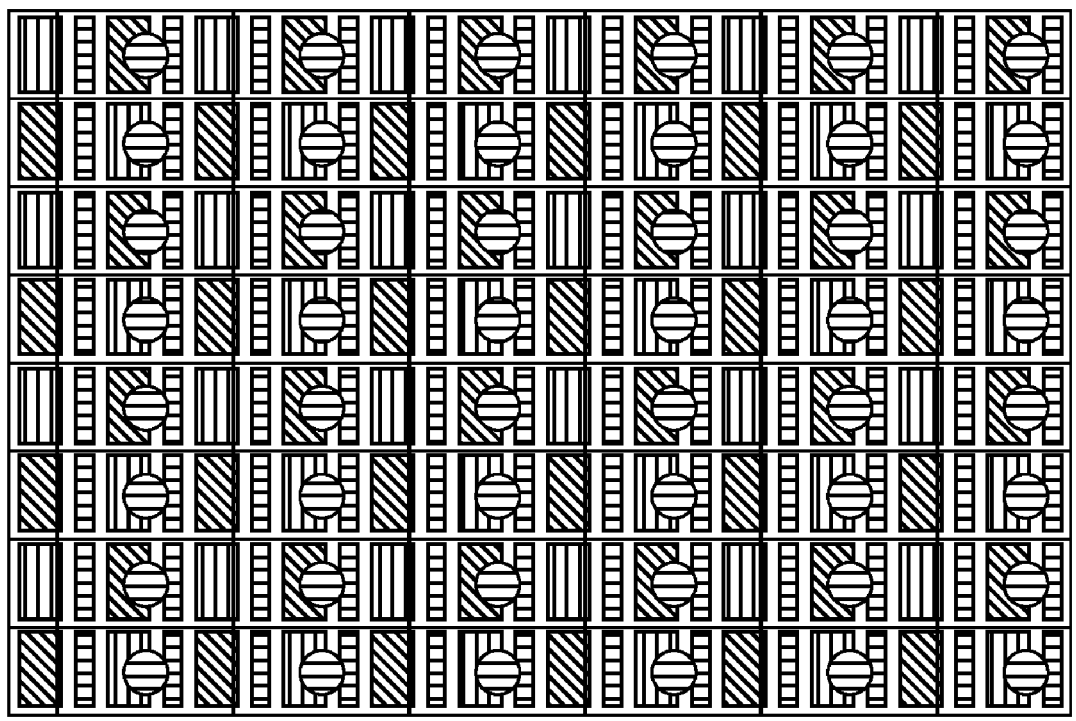
FIGS. 12 and 14 show how the respective blue color plane resample areas of FIGS. 11 and 13 would map onto the sub-pixel layout as shown in FIG. 1.
Figure 13:
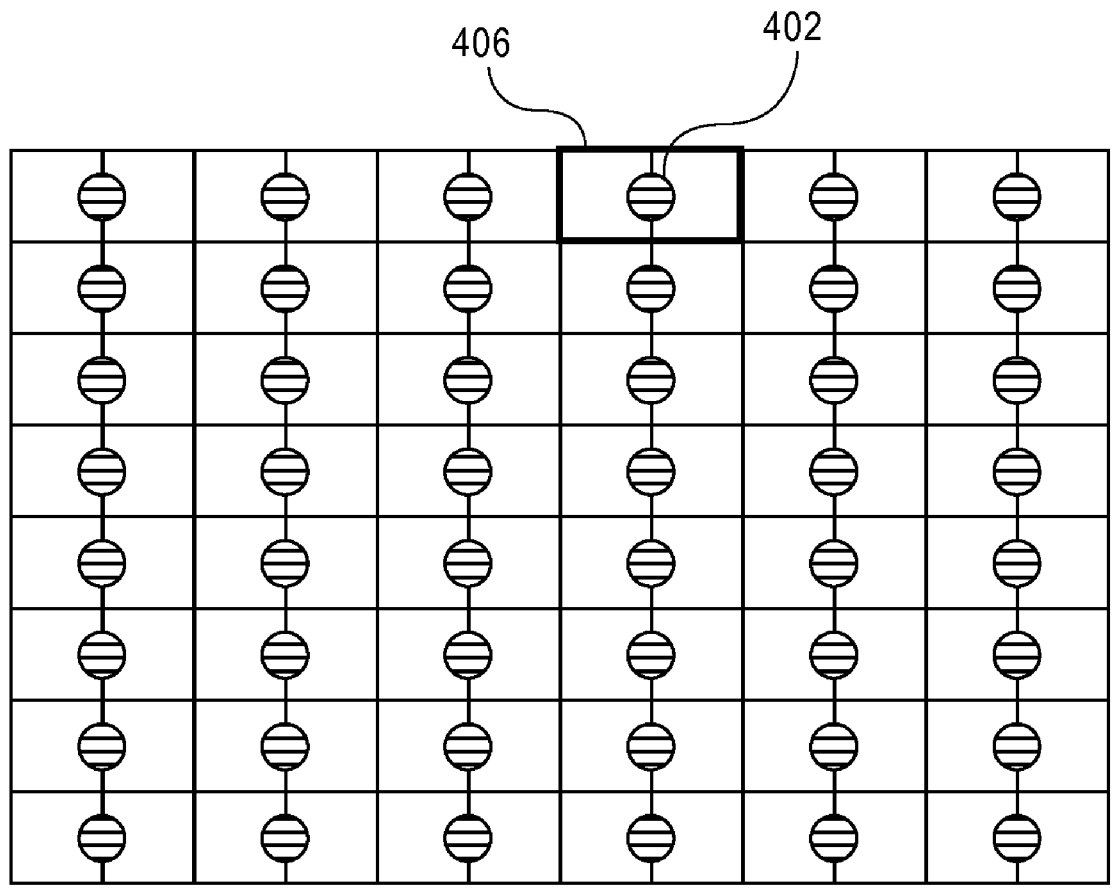
Figure 14:
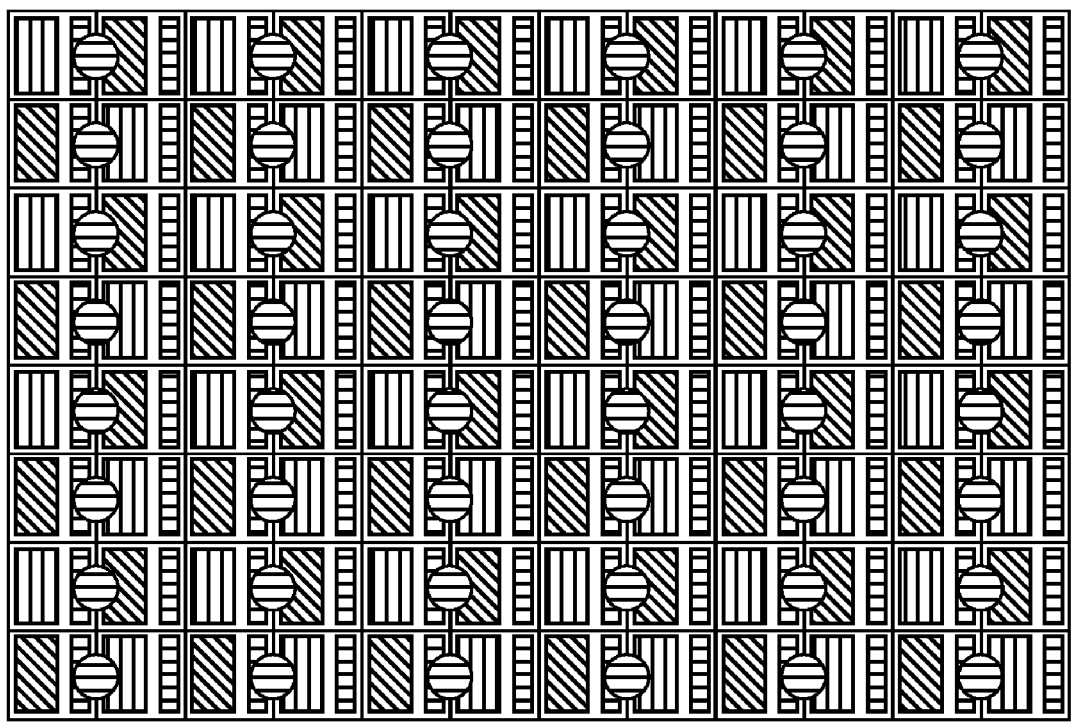

FIGS. 11 and 13 each depict a blue color plane resample area array that may be used in place of the one shown in FIG. 4. FIGS. 12 and 14 show how these respective blue color plane resample area arrays would map onto the sub-pixel arrangement 100 of FIG. 1. FIGS. 11 and 13 depict two different embodiments of resample areas 406 for blue with the phase shift shown. It should be appreciated that other phase shifts suffice for the purposes of the present invention. Additionally, other resample areas for the blue pixel data could be employed without departing from the scope of the present invention.

These Figures are merely illustrative and only serve to provide an understanding of the relationship between the resample points, reconstruction points, resample areas, and sub-pixel locations for this embodiment.

The sub-pixel rendering techniques as described in the '058 patent application can be used to convert the incoming data format to the format suitable for the display having the sub-pixel arrangement 100 of FIG. 1. In such a case, the method proceeds as follows: (1) determining implied sample areas for each data point of incoming three-color pixel data; (2) determining the resample area for each color sub-pixel in the display; (3) forming a set of coefficients for each said resample area, the coefficients comprising fractions whose denominators are a function of the resample area and whose numerators are a function of an area of each implied sample area that may partially overlap the resample area; (4) multiplying the incoming three-color pixel data for each implied sample area by the coefficient resulting in a product; and (5) adding each product to obtain a luminance value for each resample area.

Other sub-pixel rendering techniques are possible to employ with the various sub-pixel arrangements as disclosed herein. For example, the techniques known as "adaptive filtering" may be employed in the same fashion as described in United States Patent Application Publication No. 2003/0085906 ("the '906 application") entitled "METHODS AND SYSTEMS FOR SUB-PIXEL RENDERING WITH ADAPTIVE FILTERING," filed on Aug. 8, 2002 as U.S. patent application Ser. No. 10/215,843, now issued as U.S. Pat. No. 7,184,066 and is commonly owned by the same assignee of this application. U.S. 2003/0085906 is hereby incorporated by reference herein. Adaptive filtering can be adopted so as not to require a 3×3 sample of input data, which uses a minimum of two lines of memory. The test may be based on a smaller sample of input data, for example 1×3 or 1×2 matrices. The input data is sampled to test for vertical or diagonal lines, dots and edges, or other high contrast features and then actions are taken, depending on the outcome of the tests.

Test masks may be used and compared to the image data to see if an edge is detected; if detected then take an appropriate action to the red and/or blue data—e.g. apply gamma or apply a new value or different filter coefficient. Otherwise, if no feature is detected, then no action may be taken.

Figure 8A:
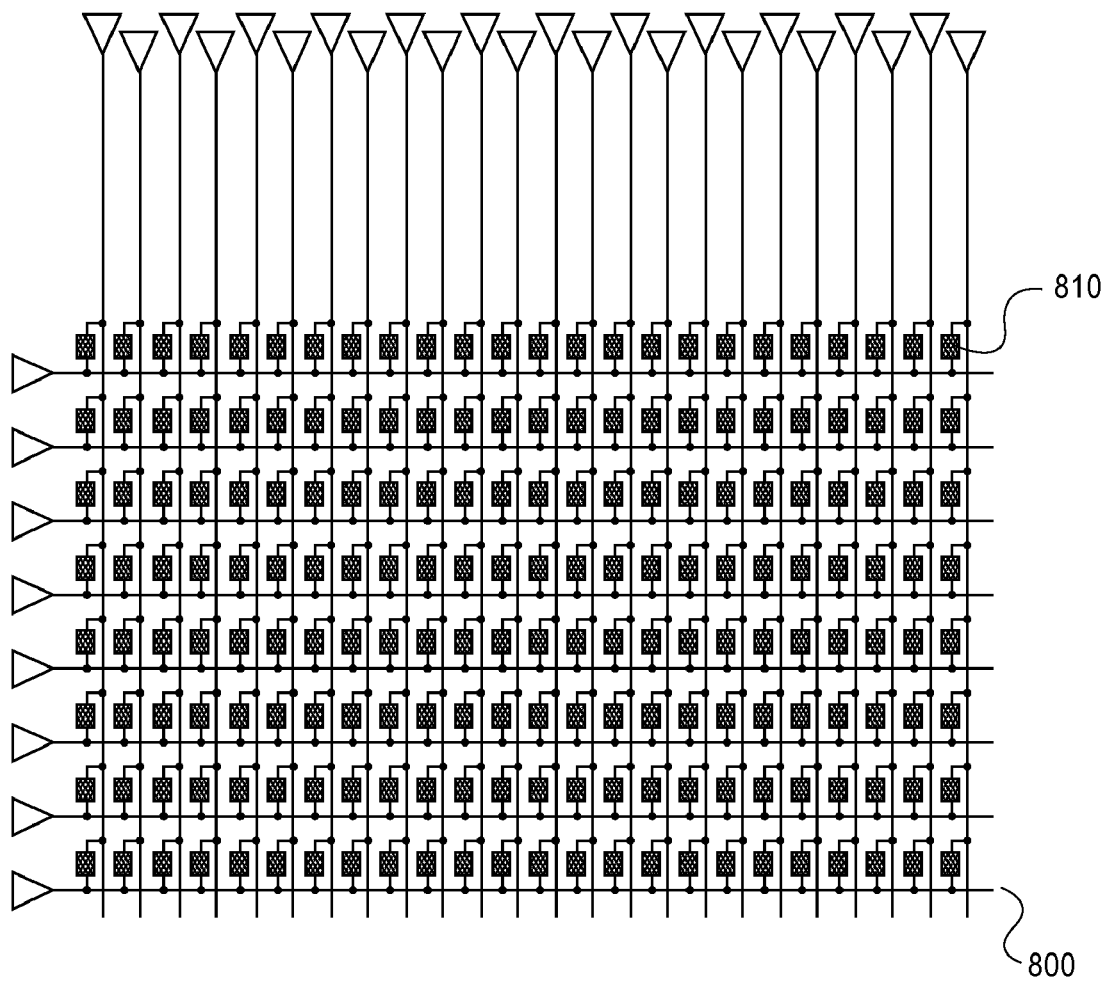
FIGS. 8A and 8B illustrate two possible schematics for a driver arrangement for the arrangement of color emitter sub-pixels in FIG. 1.
Figure 8B:
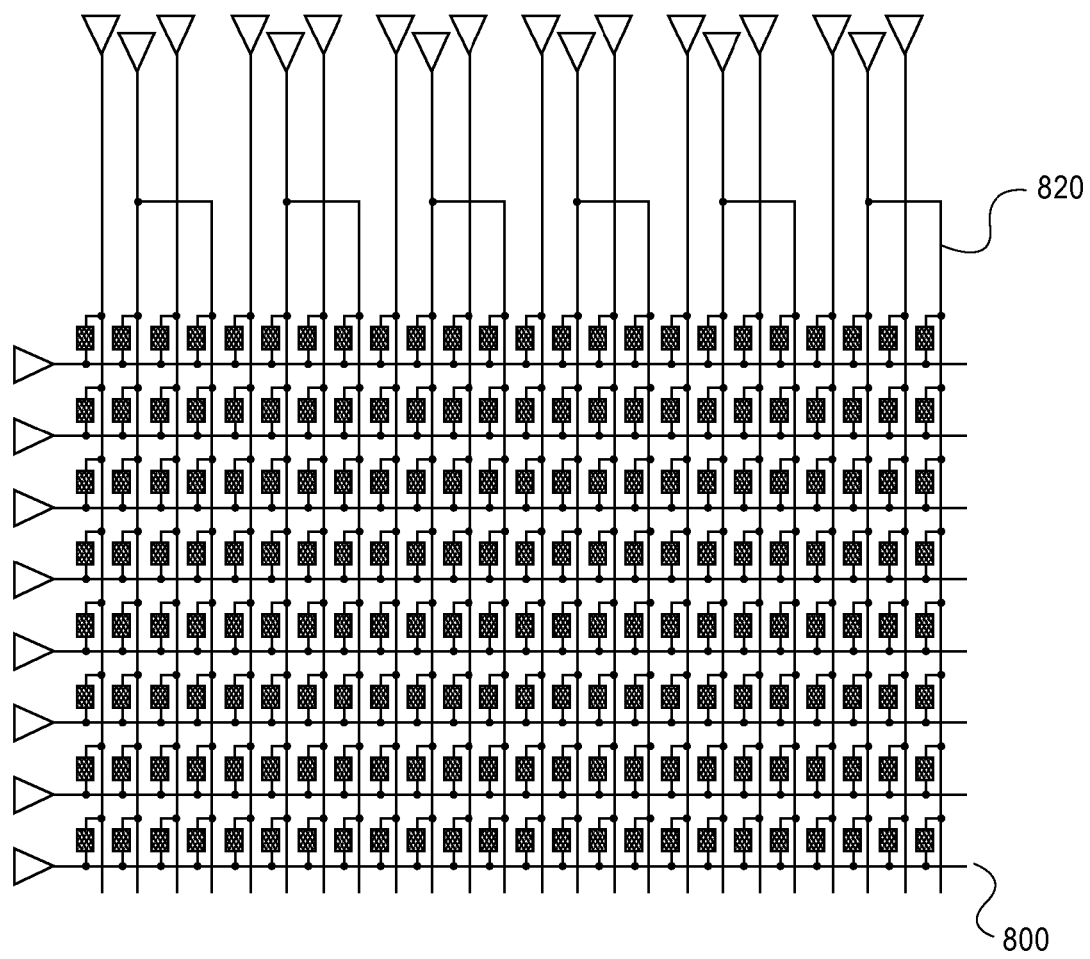
Figure 17:
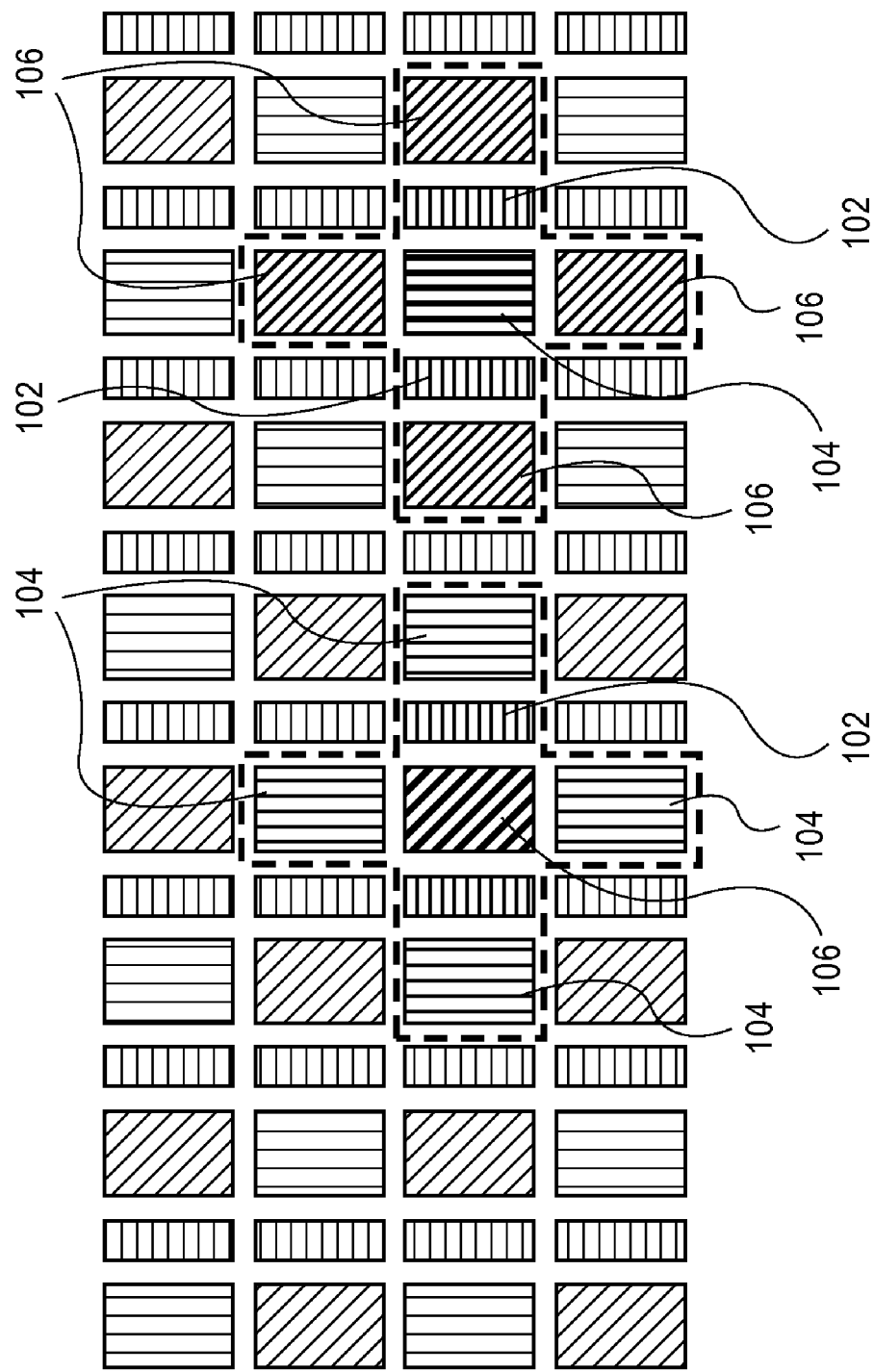
FIG. 17 illustrates the results of turning on two full color incoming data pixels.

FIG. 17 illustrates the results of turning on two full color incoming data pixels. The two pixels are converted to two clusters of sub-pixels, called "logical pixels", turned on at varying amplitudes. The logical pixel bounded by dashed lines on the left is centered on or near a green sub-pixel 106. The logical pixel bounded by dashed lines on the right is centered on or near a red sub-pixel 104. In both logical pixels, the various sub-pixels are turned on to the appropriate illumination such that a pleasing white color is formed and centered on the green and red sub-pixels, respectively. Driver addressing arrangements for display panels having subpixel repeating groups with "split blue" subpixels FIGS. 8A and 8B illustrate two possible schematics for a driver arrangement 800 for the arrangement of color emitter sub-pixels in FIG. 1. FIG. 8A shows a one to one correspondence of column drivers to columns in the display; however, with the split blue sub-pixels, it may be desirable to tie adjacent columns of split blue sub-pixels via connections 820. As may be seen in FIG. 8B, this scheme has the advantage of saving on the number of column drivers.

For convenience, these examples given have the same number of sub-pixels illustrated as FIG. 1. These drive arrangements may be used for a number of display technologies, as the blocks 810 may represent one or several electrical components. They may represent the capacitive display cell element for passively addressed Liquid Crystal Display (LCD), or ElectroLuminescent (EL) Display. It may represent the gaseous discharge element in a Plasma Display Panel (PDP). It may represent the semiconductor diode element of a passively Inorganic Light Emitting Diode or an Organic Light Emitting Diode Display. It may represent the transistor, storage capacitor, and capacitive cell element of an Active Matrix Liquid Crystal Display (AMLCD). It may represent the multi-transistor, storage capacitor, and light emitting element of an Active Matrix Organic Light Emitting Diode Display (AMOLED). It may represent, in general, the color sub-pixel and its associated electronic elements found in other known or yet to be invented display technologies.

Known drive timing and methods may be used for N X M drive matrices as those shown. However, there may be modifications needed due to the specific color assignments, particularly any checkerboard across the panel or color alternations within a single column. For example, the technique known in the art as Multi-Line Addressing for passive LCD may be modified such that groupings of rows are restricted to odd and even row combinations. This will reduce potential color cross talk since, within a column with two alternating color sub-pixels, only one color will be addressed at a time.

Figure 9:
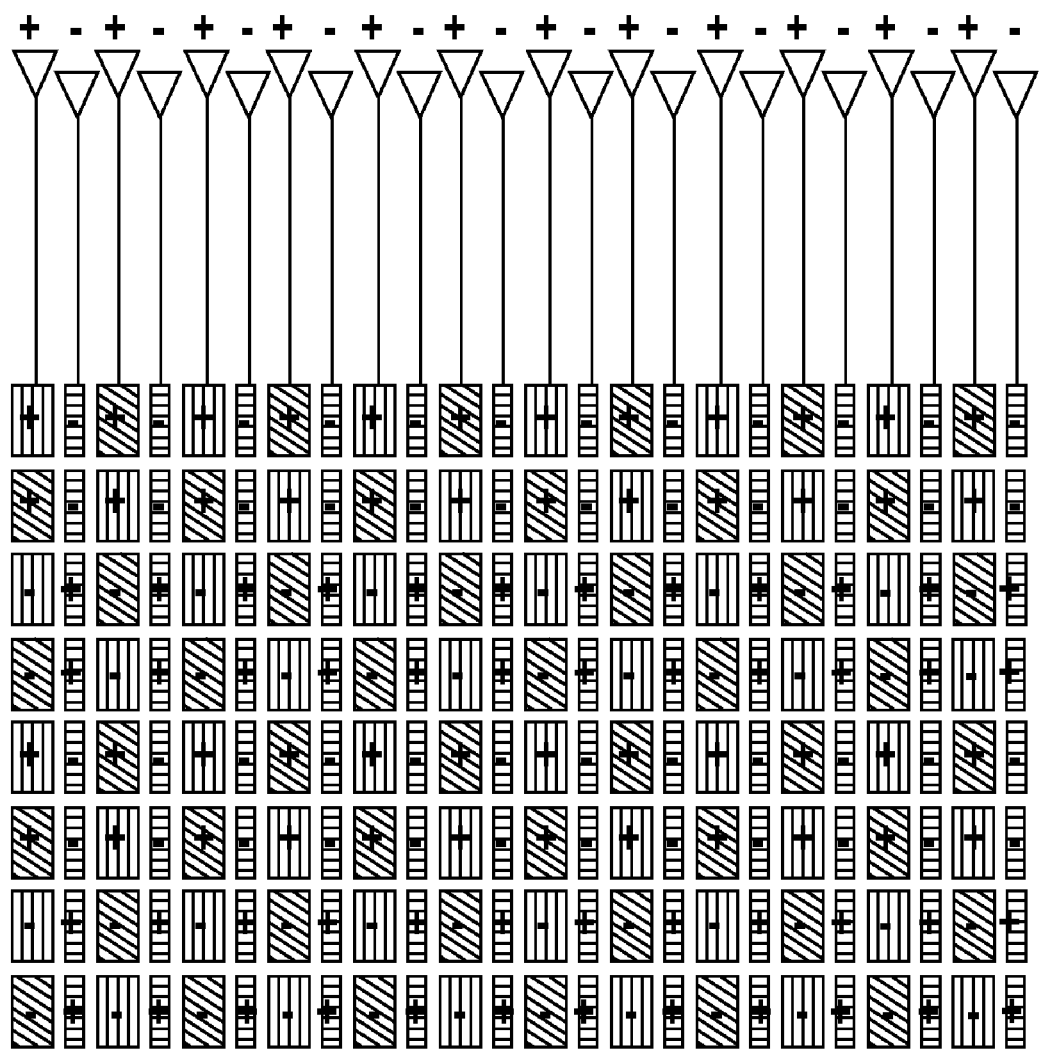
FIGS. 9 and 10 show two "dot inversion" schemes—commonly known as "2×1" and "1×1", respectively—matching FIG. 8A's schematic.
Figure 10:
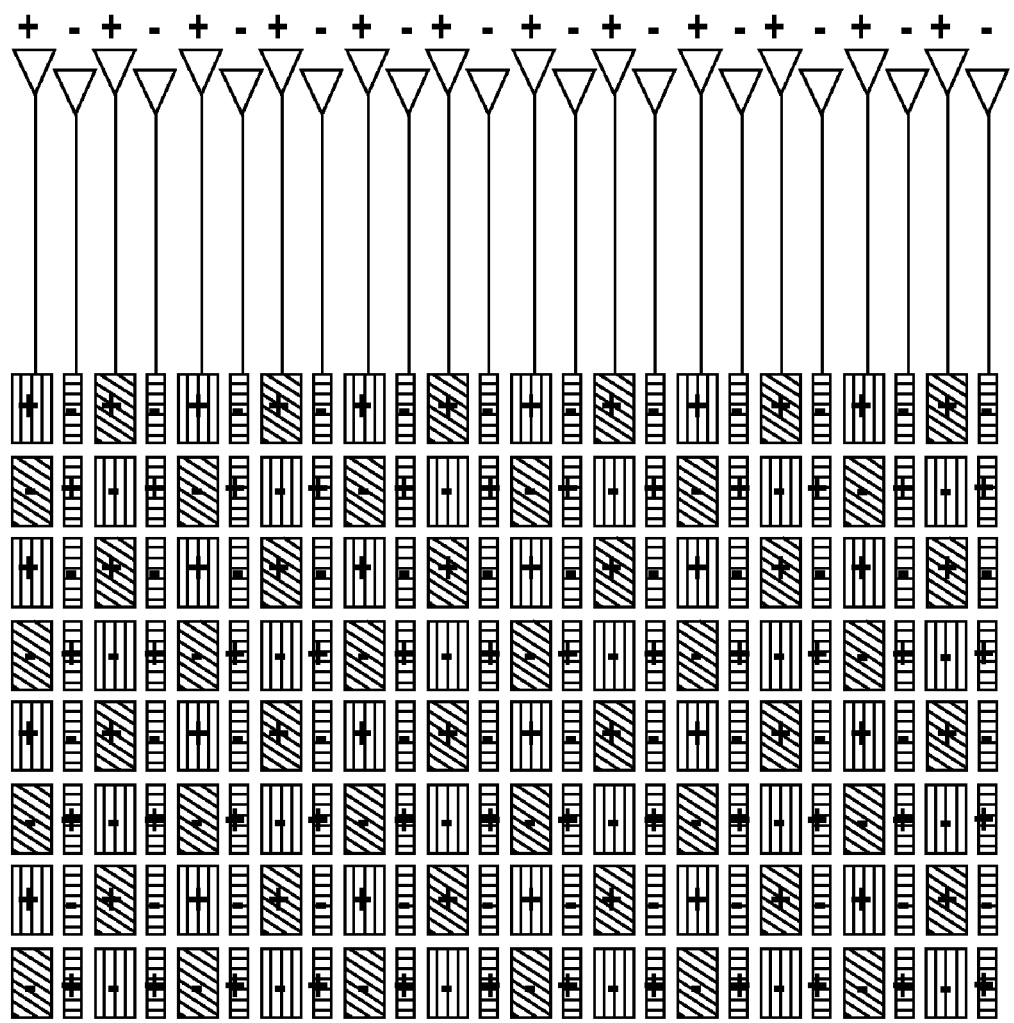
Figure 15:
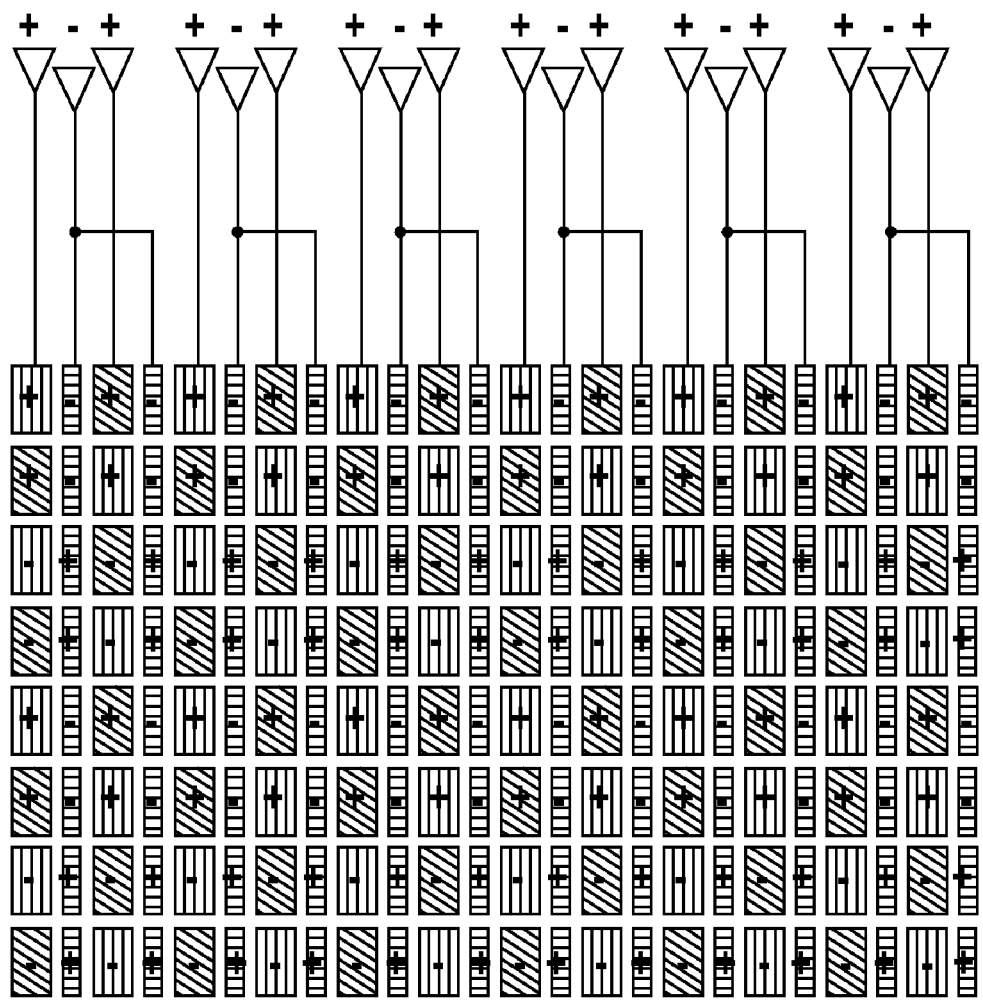
FIGS. 15 and 16 show two "dot inversion" schemes—commonly known as "2×1" and "1×1", respectively—matching FIG. 8B's schematic.
Figure 16:
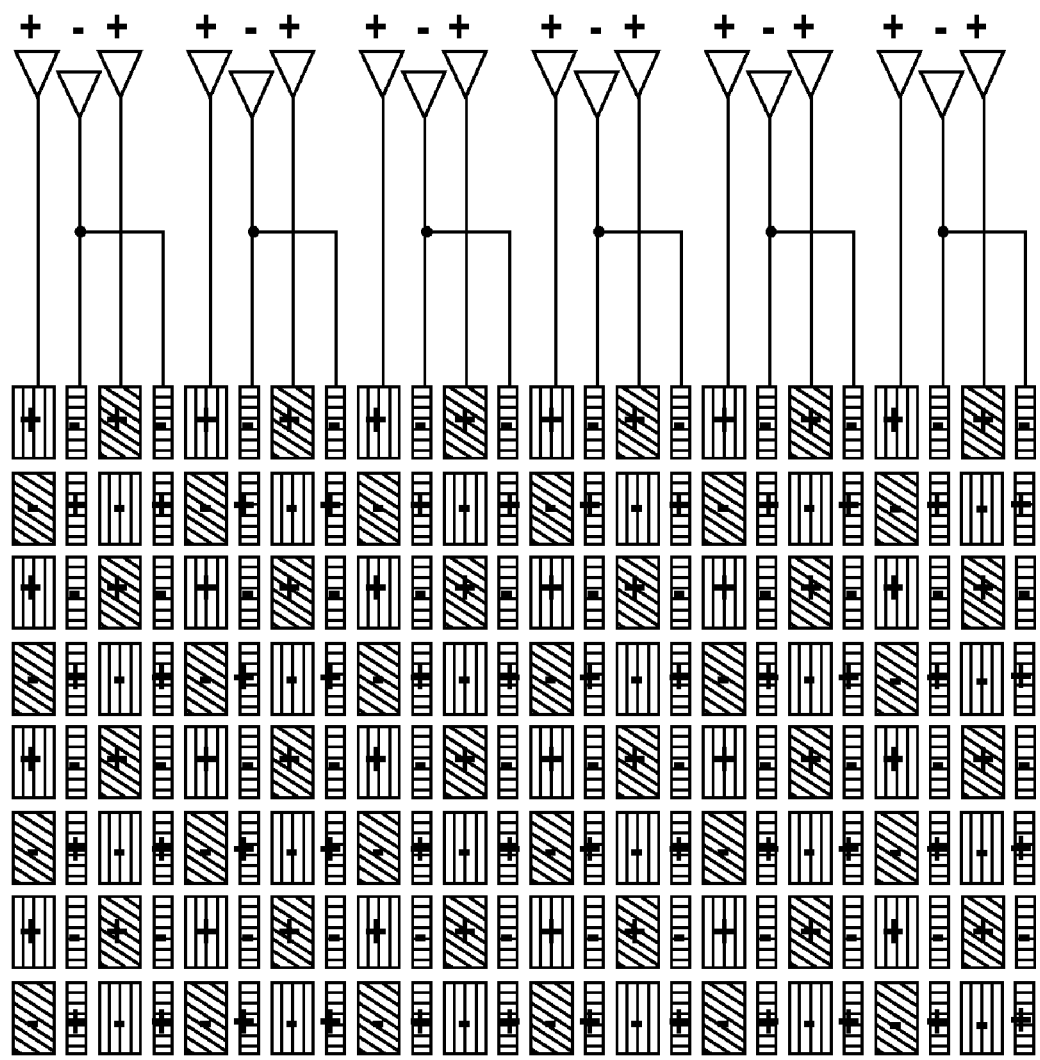

Inversion schemes, switching the electrical field polarity across the display cell to provide a time averaged zero net field and ion current across the cell can be used to the above unique sub-pixel arrangements. FIGS. 9 and 10 (matching FIG. 8A's schematic) and FIGS. 15 and 16 (matching FIG. 8B's schematic) show two "dot inversion" schemes—referred to as "2×1" and "1×1", respectively—on Active Matrix Liquid Crystal Displays, both of which will perform satisfactorily. The scheme shown on FIGS. 9 and 15 may perform better when slight imbalances of light transmission occur between positive and negative polarities, especially when the eye is tracking the motion of displayed images moving across the screen. Each of the Figures shows the polarities during half of the display addressing fields. The polarities are reversed for the other half, alternating every field, resulting in a net zero current (zero DC bias), as is well known in the art.

Figure 20:
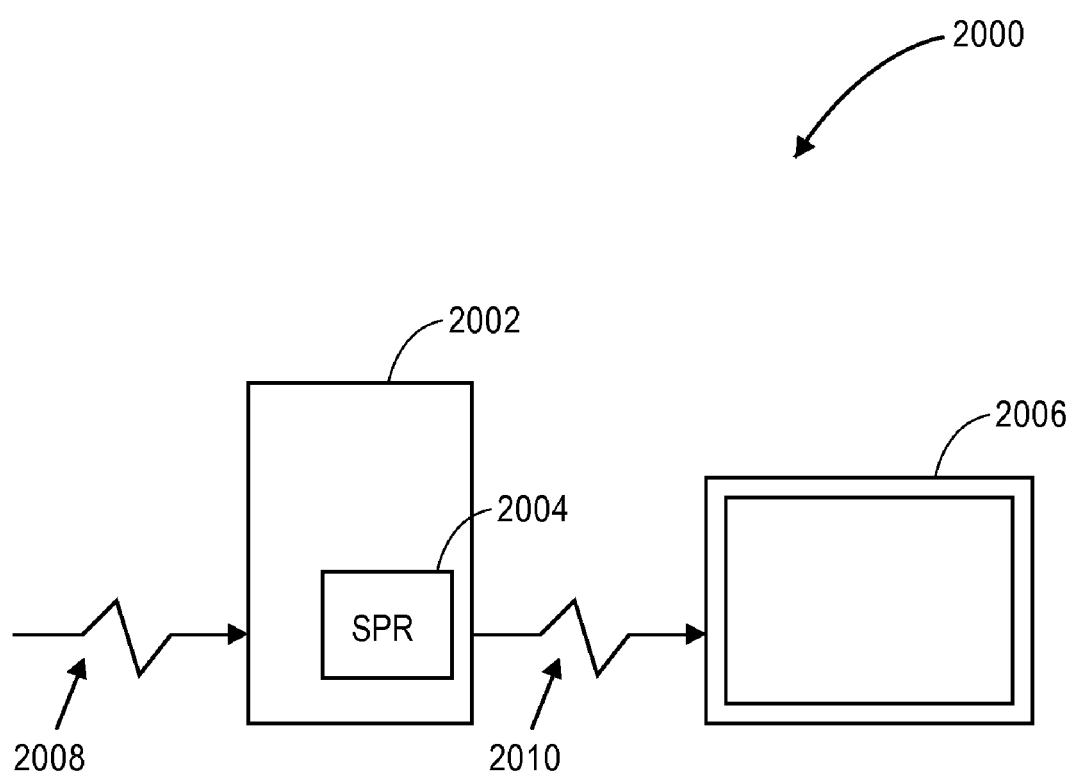
FIG. 20 depicts a system incorporating sub-pixel rendering techniques suitable to drive a panel made in accordance with the various embodiments described herein.

FIG. 20 depicts a system 2000 in which a display as constructed in accordance with the various embodiments disclosed herein is driven by a sub-pixel rendering technique 2004 which may be resident on a physical device 2002. An input image data stream 2008 may be input into the sub-pixel rendering technique 2004 and converted in the manner herein disclosed. An output image data stream 2010 is sent to the display device 2006 in order to drive the various sub-pixels to form an image thereupon. As discussed in several references incorporated herein, the sub-pixel rendering (SPR) technique 2004 may be implemented in either hardware and/or software or a combination thereof For example, SPR techniques 2004 could be resident as logic (either hardware or software) on the display itself or it could reside on a graphics controller chip or board.

Display Panels Comprising Additional Subpixel Repeating Groups With "Split" Subpixels As noted in the related '423 application referenced above, in prior art RGB stripe display panels, the blue subpixels are seen as producing visible stripes on the display. That is, when viewed, the luminance channel of the human vision system sees blue subpixels as dark (black) stripes alternating with the combination of the red and green subpixels, which produces white stripes. In the horizontal direction, there are faint, but discernable lines between rows of three-color pixel elements largely due to the presence of the transistors, and/or associated structures, such as capacitors, at each subpixel, as is common in the art.

Figure 21:
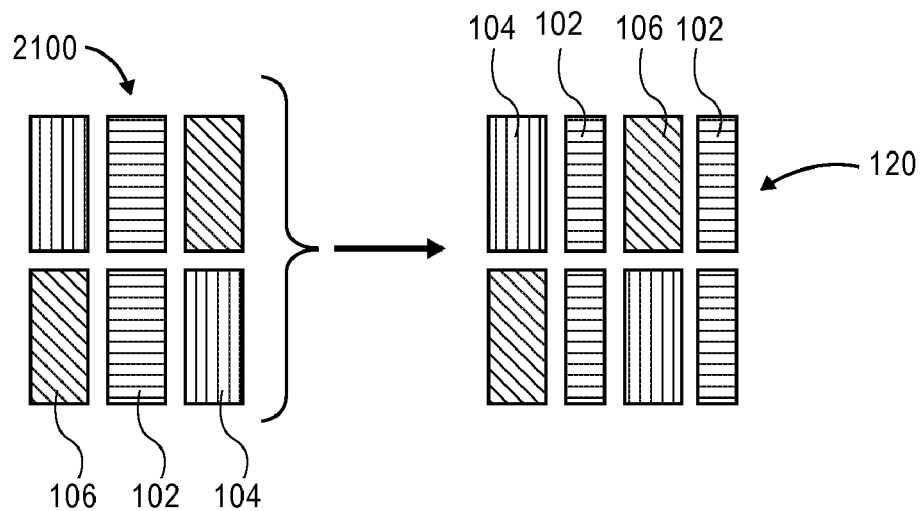
FIG. 21 shows the arrangement of sub-pixels of FIG. 1, and illustrates the concept of "splitting" the blue sub-pixels.

FIG. 21 illustrates subpixel repeating group 2100 showing a two-row arrangement of six subpixels including two red subpixels 104 (shown with vertical hatching as in the figures above), two green subpixels 106 (shown with diagonal hatching as in the figures above) and two blue subpixels 102 (shown with horizontal hatching as in the figures above). Dividing, or "splitting" the single blue subpixel 102 in each row into two subpixels, each having a smaller width in the horizontal direction, and then inserting one of the smaller blue subpixels 102 between the red and green subpixels, produces subpixel repeating group 120 of FIG. 1 herein. As noted above, the luminance channel of the human vision system no longer sees visible stripes, but rather sees black dots alternating with white dots. This is an improvement because the spatial frequency, i.e. Fourier Transform wave component, and the energies of these components are now spread into every axis, vertical, diagonal, as well as horizontal, reducing the amplitude of the original horizontal signal, and thus, the visual response (i.e., visibility).

In U.S. Patent Application Publication 2005/0225574 ("the '574 application"), which is published U.S. patent application Ser. No. 10/821,353, entitled "Novel Subpixel Layouts and Arrangements for High Brightness Displays," it is noted that an electronic display may best render natural scenes if the display is capable of creating very bright non-color-saturated colors and darker highly saturated colors. The '574 application further notes that a conventional RGB stripe display is a color additive system whose non-saturated color brightness is limited to the addition of partially-saturated colors. The brightness/saturation color gamut of the RGB system generally has brighter non-saturated colors, but fails to reproduce the very bright non-saturated colors. There is a trade-off between the brightness of the non-saturated colors and the color saturation gamut of the filtered backlight display. The more saturated the color filters, the less these filtered colors may add to the non-saturated brightness. This creates a luminance/saturation compression in which the non-saturated colors are reduced in brightness and saturated colors are compressed, desaturated, to fit within the limitations of the compromise system.

The '574 application proposes several variations of display panels comprising subpixels having more than three primary colors, referred to as "multiprimary" displays. In particular, the '574 application proposes variations of a display panel having red. green and blue (RGB) primaries plus an additional non-saturated neutral colored subpixel which is considered to be a primary color. The non-saturated neutral colored primary subpixel is formed by an appropriate color filter. The neutral primary color may be white, in which case the subpixel is formed using a transparent filter that allows substantially all of the light through, while the other three colors are formed by filtering out all but a narrow band of the spectrum. The white subpixel may have up to four or more times the brightness of the colored subpixels. Thus, the use of a white subpixel significantly increases the brightness of the panel when displaying non-saturated colors. When one fourth of the area of the display panel is used for the white subpixel, the brightnesses of the remaining RGB subpixels are reduced by one fourth. However, non-saturated colors may be formed with a contribution from the bright white subpixel, giving significantly higher brightness. The resulting display panel has a brightness/color gamut envelope shape that is closer to that of the 'real world'.

Figure 22:
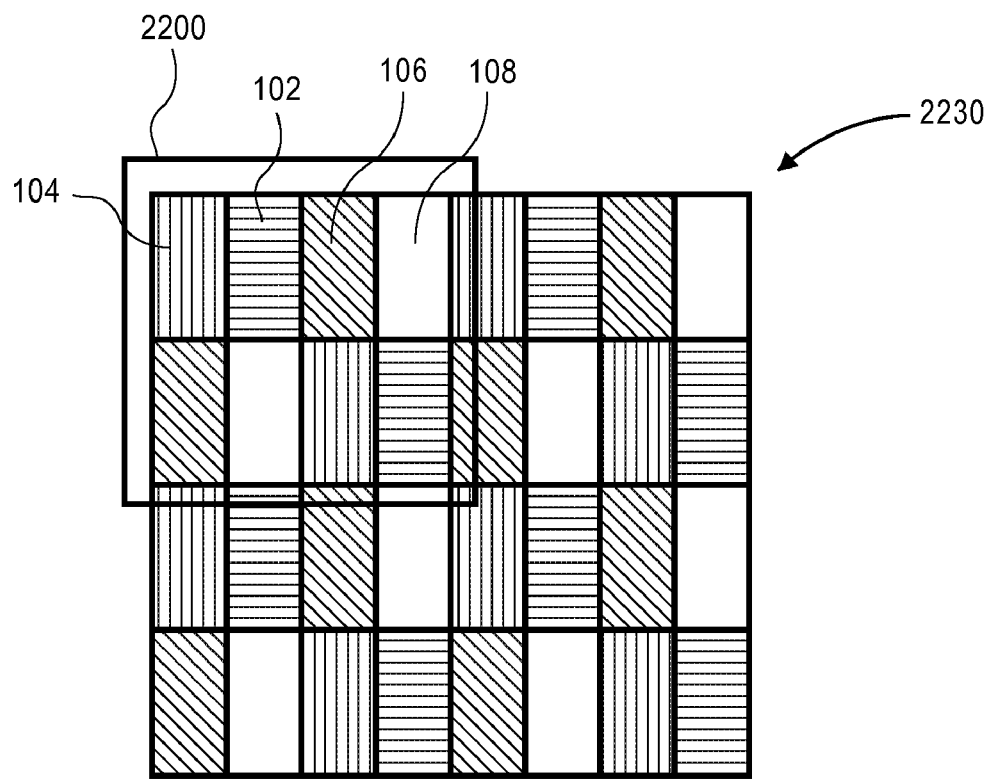
FIG. 22 illustrates a portion of a display panel comprising a subpixel repeating group that includes subpixels in three primary colors and a white subpixel that functions as a fourth primary color.

FIG. 22 illustrates a portion 2230 of a display panel introduced in the '574 application as one embodiment of an RGBW display panel. Portion 2230 of the display panel substantially comprises subpixel repeating group 2200. In this embodiment, the subpixels are of substantially equal size to maintain white balance. Subpixel repeating group 2200 is comprised of 2 rows of 4 subpixels having the colors RBGW in the first row and GWRB in the second row. The number of colors in each row (R,G,B,W), is the same within a subpixel repeating group, resulting in balanced white with existing backlights. As noted in the '574 application, the horizontal and vertical resolution of a display panel substantially comprising subpixel repeating group 2200 should be the same as panels with the conventional RGB stripe subpixel repeating group, but the number of column drivers and thin-film transistors (TFTs) is reduced by one-third ($\frac{1}{3}$). Brightness gain depends on color filter transmission; assuming 25% transmission (typical) for colored filters and 100% for white, then transmission for white screen is $(\frac{3}{4})*25+(\frac{1}{4})*100=\frac{175}{4}=43.75\%$ which is roughly a gain of $43.75/25=1.75$. Note that a display panel is said to "substantially" comprise a particular subpixel repeating group to allow for manufacturing constraints: the subpixel repeating group array is repeated across a panel to complete a device with a desired matrix resolution, but subpixel repeating groups occurring at the edges of a panel may not be complete.

Figure 23:
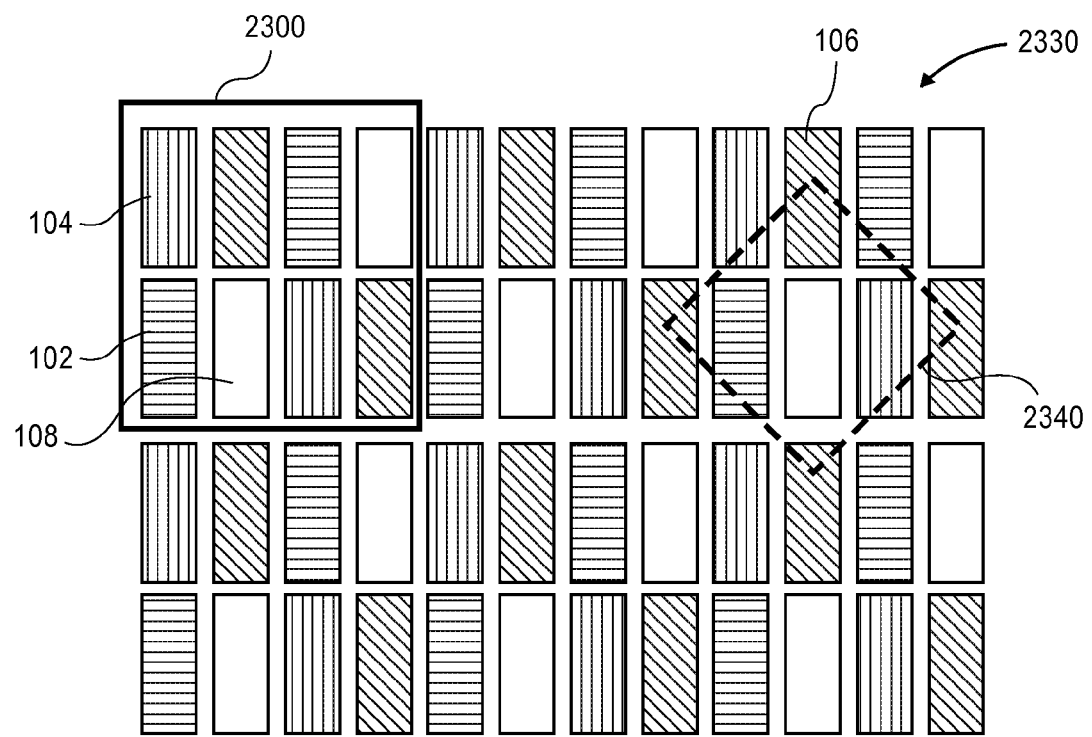
FIG. 23 illustrates a portion of another display panel comprising the subpixel repeating group of FIG. 22 in which the subpixels are arranged in a different color order.

FIG. 23 illustrates another embodiment of an RGBW subpixel repeating group. Portion 2330 of the display panel illustrated substantially comprises subpixel repeating group 2300 with its subpixels in a 1:2 aspect ratio. Subpixel repeating group 2300 is also comprised of 2 rows of 4 subpixels having the colors RBGW in the first row and GWRB in the second row. This layout may have fewer edge boundaries that give rise to liquid crystal disinclinations, and thus may have a higher contrast than an LCD display panel with the conventional RGB stripe layout. A display panel substantially comprising subpixel repeating group 2300 has 25% white area; thus, it can have approximately 75% to 100% higher brightness than the conventional RGB stripe panel with the same resolution. Note that each color is on a square grid at 45°, as illustrated by diamond shaped dashed outline 2340 having green subpixel 106 at each vertex of the diamond shape. This layout requires only one row of subpixels to draw a single white line, while it still requires two subpixel columns.

Figure 24:
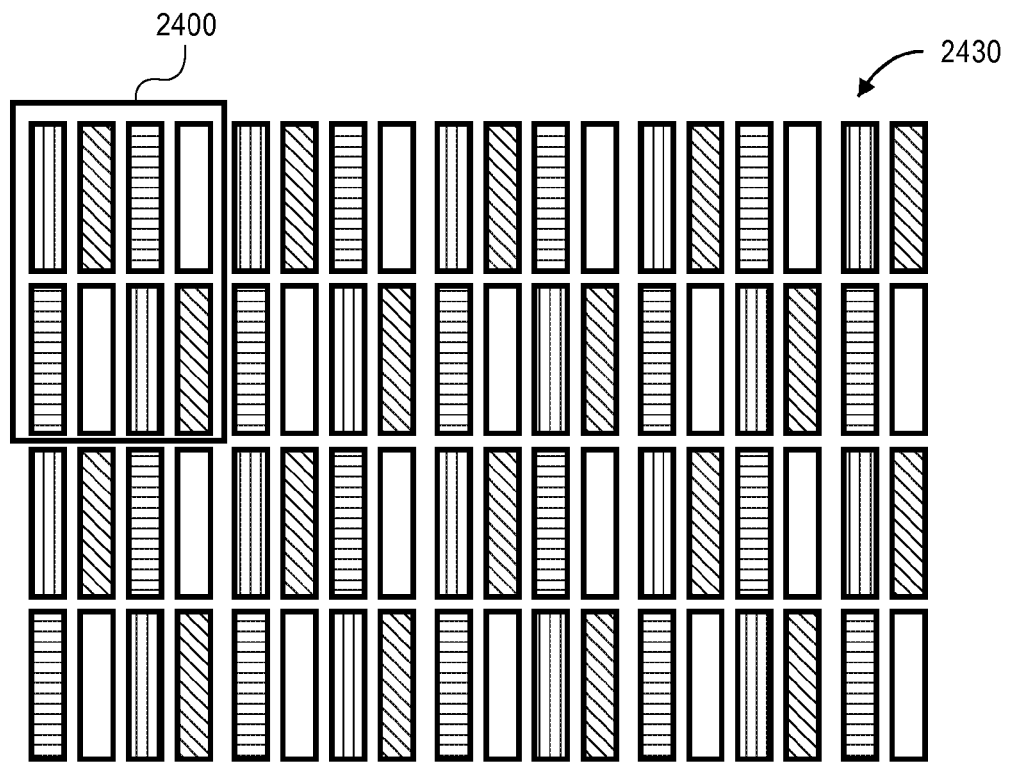
FIG. 24 illustrates a portion of another display panel comprising the same subpixel repeating group of FIG. 23 having a different aspect ratio.

FIG. 24 illustrates another embodiment of an RGBW subpixel repeating group. Portion 2430 of the illustrated display panel substantially comprises subpixel repeating group 2400 comprising the same subpixel order as subpixel repeating group 2300 of FIG. 23, but with its subpixels in a one-to-three (1:3) aspect ratio, which may allow for easier utilization of existing backplanes for this layout. A display panel substantially comprising subpixel repeating group 2400 would then have a higher MTFL in the horizontal axis than the conventional RGB it replaces. It would also be approximately 75% brighter. The additional horizontal resolution may further reduce moiré distortion. If the input signal has higher resolution, such as scaling down a 1080i signal to a 720 p HDTV LCD, or 720 p on a 480i TV, this panel may show up to 50% higher horizontal resolution than a conventional RGB stripe panel, thus showing the full horizontal resolution of the higher resolution format.

Figure 25:
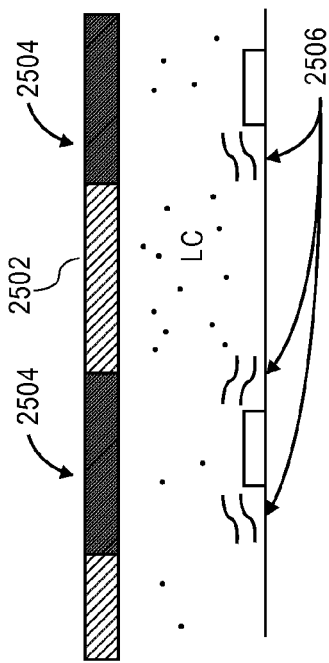
FIG. 25 is a schematic diagram of a portion of a liquid crystal display and illustrating the use of an enlarged black matrix adjacent to color filters.

As noted above, LCD contrast is set by many parameters, including light leakage from disclinations or other LC distortions around the edges of subpixels. To cancel the light coming from these regions, the black matrix may be enlarged to cover this region. This may reduce light transmission, but also may improve contrast. FIG. 25 shows one embodiment of a portion of an LCD panel with an enlarged black matrix adjacent to colored filter 2502; the enlarged black matrix tends to hide the disinclination regions 2506 below.

The '574 application notes that, while the display panels described therein are suitable to LCD displays, the panels would find equal application in the area of incandescent lamp based displays, Light Emitting Diode (both organic and inorganic) based displays, Plasma display panels (PDP) and many other various display technologies. The '574 application further notes that different aspect ratios and color subpixel order are also contemplated as being possible as alternative embodiments of the RGBW display panels.

Co-pending and co-owned U.S. patent application Ser. No. 10/821,388 (the '388 application), entitled "Subpixel Rendering Filters for High Brightness Displays" discloses techniques for rendering an input image data stream onto a display panel comprising one of the subpixel repeating groups described in conjunction with FIGS. 22, 23 and 24. U.S. patent application Ser. No. 10/821,388 is published as U.S. 2005/0225563, which is hereby incorporated by reference herein.

Images displayed on display panels comprising subpixel repeating group 2300 (FIG. 23), for example, in which blue subpixel 102 is adjacent to white subpixel 108 in the subpixel repeating group, may have certain visual artifacts that are caused by the proximity of low luminance blue subpixel 102 to high luminance white subpixel 108, and the lower luminance red subpixel 104 to the relatively higher luminance green subpixel 106. For example, such images may appear to have a "window screen" effect with low spatial frequency light and dark regions.

Figure 26:
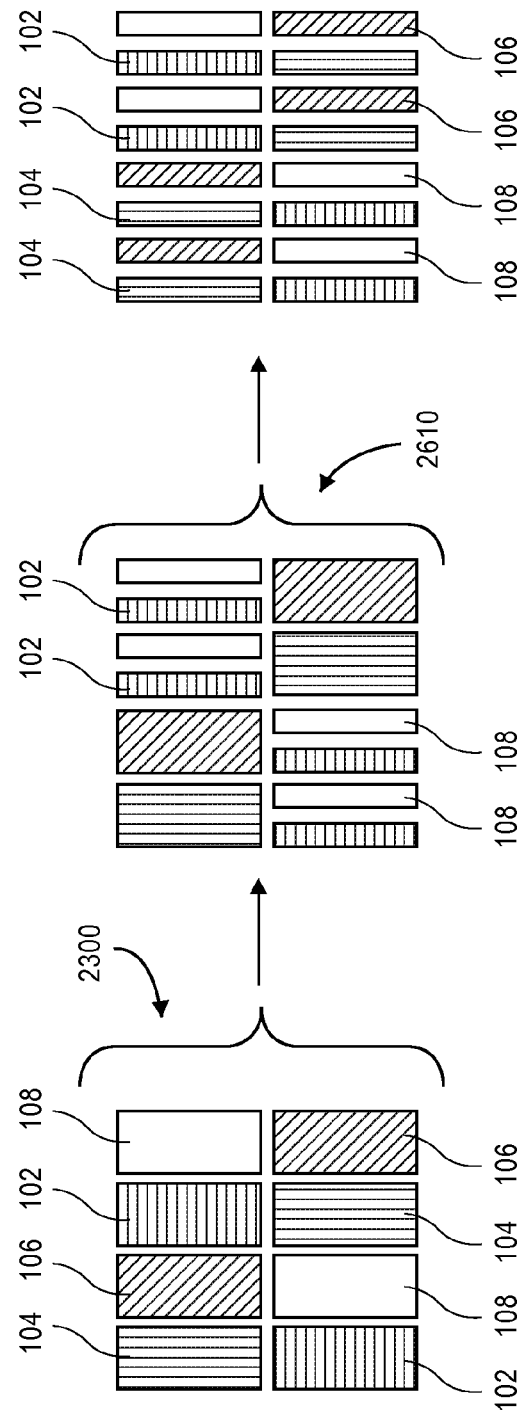
FIG. 26 illustrates the concept of splitting the subpixels in the subpixel repeating group of FIG. 23 to produce a new subpixel repeating group.
Figure 27:
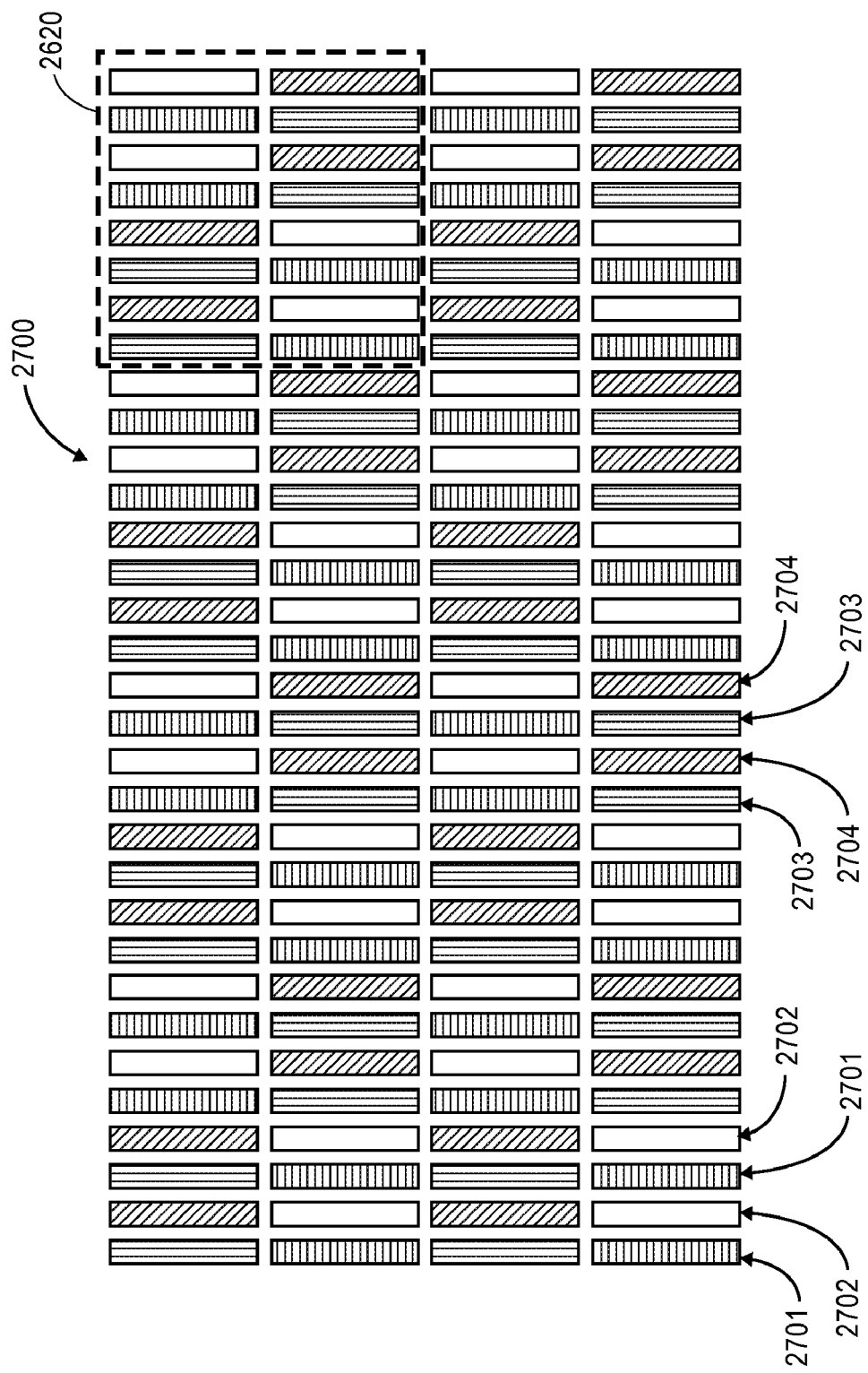
FIG. 27 illustrates a portion of a display panel comprising the subpixel repeating group of FIG. 26 having the split sub-pixels.

Image quality may be improved on such displays by employing the "split" subpixel technique disclosed above in the discussion of FIG. 1. FIG. 26 illustrates subpixel repeating group 2300 from FIG. 23. Dividing, or splitting, each of the blue subpixels 102 and white subpixels 108 results in subpixel repeating group 2610. Treating red subpixels 104 and green subpixels 106 in the same manner produces subpixel repeating group 2620. FIG. 27 shows a portion 2700 of a display panel comprising eight (8) instances of subpixel repeating group 2620. The split subpixels form columns of red and blue subpixels 2701, green and white subpixels 2702, blue and red subpixels 2703 and white and green subpixels 2704.

Figure 28:
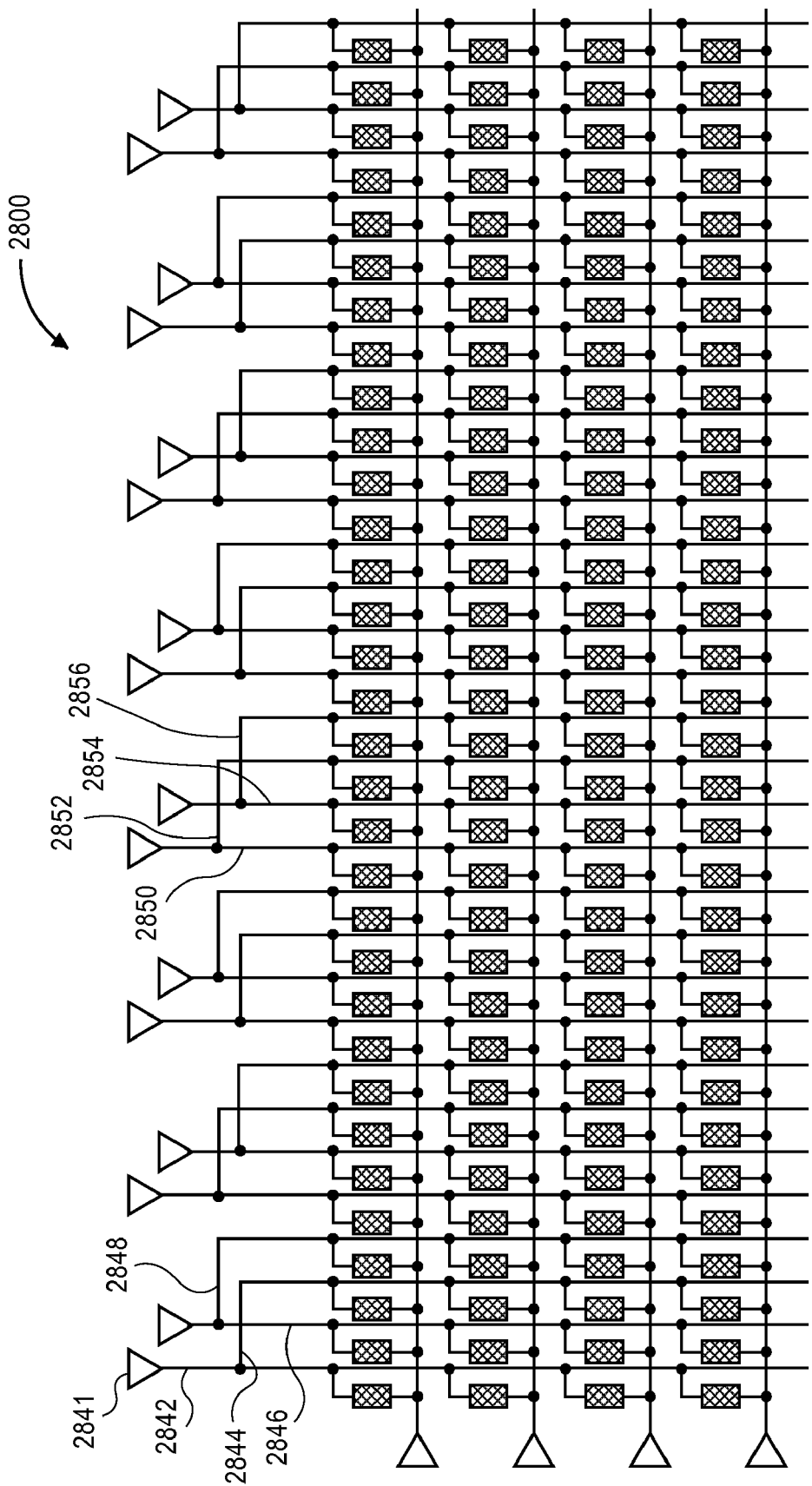
FIG. 28 is a schematic diagram of a portion of a driver configuration for the poriton of the display panel of FIG. 27.

FIG. 28 is a diagram of an embodiment of a driver configuration 2800 for the portion 2700 of a display panel comprising subpixel repeating group 2620. Driver configuration 2800 utilizes the "tied" column driver configuration of FIG. 8B to reduce the number of column drivers needed to implement a display panel comprising subpixel repeating group 2610. In configuration 2800, the column drivers are denoted at the top of the figure by inverted triangles. Column driver 2841, which drives first column 2701 of red and blue subpixels in the display portion of FIG. 27, also drives second column 2701 of red and blue subpixels via a second, crossover column line 2844; that is column driver 2841 sends signals along column line 2842, and along column line 2844. In a similar manner, the next column driver connected to column line 2846, which drives first column 2702 of green and white subpixels, also drives second column 2702 of green and white subpixels via column line 2848. The split blue and white subpixels utilize a similar driver configuration: the column driver connected to column line 2850 drives first column 2703 of blue and red subpixels and also drives second column 2703 of blue and red subpixels via crossover column line 2852; the column driver connected to column line 2854, which drives first column 2704 of white and green subpixels, also drives second column 2704 of white and green subpixels via second column line 2856. Thus, a display device configured in this manner includes a plurality of column drivers for sending signals to the sub-pixels to produce luminance values. The column drivers are configured such that a column driver providing a signal via a column line to a first occurrence of a sub-pixel having a first one of the primary colors includes a crossover column line connected to a second occurrence of the sub-pixel having the first one of the primary colors.

As noted above with respect to the discussion of FIG. 8A, the driver configuration could also be implemented as a one-to-one correspondence of column drivers to columns in the display. The examples of the polarity inversion schemes discussed above are applicable to the display configuration shown in FIG. 27. Several co-pending and co-owned applications discuss additional considerations with regard to assigning polarity schemes to display panels comprising subpixel repeating groups having an even number of subpixels. See, for example, U.S. Patent Application Publications 2004/0246213, 2004/0246381, 2004/0246279, 2004/0246393 and 2004/0246404, which are all hereby incorporated by reference herein.

Figure 30:
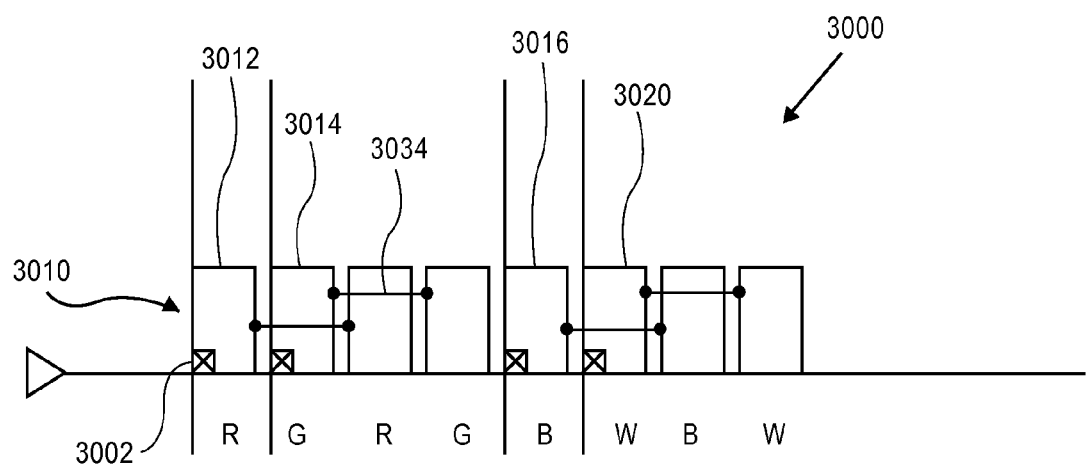
FIG. 30 is a schematic diagram of an enlarged portion of a TFT array for the subpixel repeating group of FIG. 26, showing crossover connections between subpixel areas.

FIG. 30 is a schematic diagram of a small portion 3000 of an enlarged TFT array of a display device having a display panel comprising subpixel repeating group 2620, or a variation thereof FIG. 30 illustrates an implementation of the display panel in which the crossover connections between the same-colored split subpixels in a row are made inside the TFT array, thus eliminating half of the TFT's and the crossover column lines shown in FIG. 28. A partial first row 3010 of subpixels having the configuration shown in FIGS. 26 and 27 includes red subpixel area 3012, green subpixel area 3014, blue subpixel area 3016 and white subpixel area 3020 each having a TFT 3002. Subpixel color assignments are shown in the figure for convenience. The second occurrence (i.e., the second half of the split subpixel) of each red, green, blue and white subpixel area is connected by a crossover connection 3034 to the same-colored subpixel area that is configured with TFT 3002 such that TFT 3002 drives both same colored subpixel areas. This embodiment of TFT array 3000 eliminates the TFTs for each connected same-colored subpixel in each row. This embodiment further eliminates column lines for the columns that include the second half of the same colored split subpixel.

Figure 29:
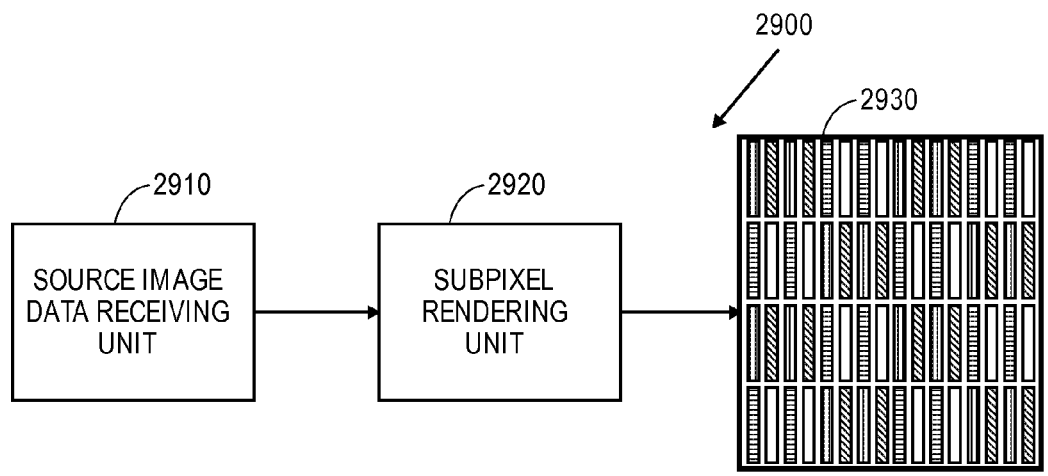
FIG. 29 is a block diagram of a display device that includes a display panel comprising the subpixel repeating group of FIG. 26 with the split subpixels.

FIG. 29 illustrates a display device 2900 comprising source image data receiving unit 2910 which is configured to receive input image data indicating an image for rendering on a display panel 2930 substantially comprising subpixel repeating group 2620. Display device 2900 also comprises subpixel rendering unit 2920 which produces luminance values for subpixels on panel 2930 according to techniques described herein and in related applications, to produce an output image on panel 2930.

While the display panels, subpixel rendering techniques and driver configurations have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof For example, alternative embodiments of the multiprimary display panels having different primary colors, different aspect ratios and different color subpixel order are also contemplated as using the split subpixel technique disclosed above to improve image quality. In addition, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AMLCD), Incandescent, solid state Light Emitting Diode (LED), Plasma Display Panel (PDP), and Iridescent. Therefore, it is intended that the invention not be limited to the particular embodiment disclosed as the best mode contemplated for carrying out this invention, but that the invention will include all embodiments falling within the scope of the appended claims.

What is claimed is:
1. A display device comprising:
 a display panel comprising a plurality of a sub-pixel repeating group; said sup-pixel repeating group comprising sixteen sub-pixels; each sub-pixel having one of at least four primary colors, wherein one of the primary colors is a non-saturated, neutral color;
 a source image data receiving unit configured to receive source image data indicating an input image, for rendering on said display panel; and a sub-pixel rendering unit configured to compute a luminance value for each sub-pixel of said display panel using the source image data, wherein said sub-pixel repeating group comprises eight sub-pixels disposed in two rows, and said sub-pixels in said four primary colors are arranged as
1SP 2SP 1SP 2SP 3SP NSP 3SP NSP 3SP NSP 3SP NSP 2SP 2SP 1SP 2SP wherein 1SP, 2SP and 3SP represent sub-pixels in first, second and third primary colors, respectively, and NSP represents a sub-pixel in said non-saturated primary color.

2. The display device of claim 1, wherein each sub-pixel that is not a sub-pixel having a non-saturated neutral color is one of a red color sub-pixel, a green color sub-pixel and a blue color sub-pixel.

3. The display device of claim 1, wherein said non-saturated neutral color is white.

4. The display device of claim 1, wherein said sub-pixel rendering unit uses an implied sample area of the input image and locations of said sub-pixels on said display panel to determine a resample area from which to compute said luminance values.

5. The display device of claim 1, wherein said sub-pixel rendering unit produces said luminance value for at least one sub-pixel of said first primary color on said display panel by multiplying a subset of source image data values for a first primary color by an image filter coefficient matrix of values to produce output products, and adding said output products.

6. The display device of claim 1, wherein said display device utilizes one of a group of display technologies, said group of technologies comprising passively addressed Liquid Crystal Display (LCD), ElectroLuminescent (EL) Display, Plasma Display, passively addressed Inorganic Light Emitting Diode, Organic Light Emitting Diode Display, Active Matrix Liquid Crystal Display (AMLCD), and Active Matrix Organic Light Emitting Diode Display (AMOLED).

7. The display device of claim 1, wherein said display panel further includes a plurality of column drivers for sending signals to said sub-pixels indicating said luminance values; each column driver comprising first and second column lines; said column driver sending a signal via said first column line to a first column of sub-pixels having a first occurrence of a first primary color sub-pixel; said column driver further sending said same signal via said second column line to a second column of sub-pixels having a second occurrence of said first primary color sub-pixel.

8. The display device of claim 1, wherein said second column line from said column driver crosses over a column line connected to a second column driver to provide said same signal to a second non-adjacent column of sub-pixels having said second occurrence of said first primary color sub-pixel.

9. The display device of claim 1, wherein said display device is a liquid crystal display device comprising an array of thin film transistors (TFT); wherein said sub-pixel repeating group comprises at least first and second sub-pixels of the same primary color; and wherein a single TFT controls an image signal for both said at least first and second sub-pixels of said same primary color.

10. The display device of claim 2, wherein said sub-pixel repeating group comprises eight sub-pixels disposed in two rows; and wherein said sub-pixels are arranges as:

R G R G B W B W
B W B W R G R G wherein R is the red color sub-pixel, G is the green color sub-pixel, B is the blue color sub-pixel, and W is the white color sub-pixel indicating the non-saturated neutral sub-pixel.

\* \* \* \* \*

UNITED STATES PATENT AND TRADEMARK OFFICE
CERTIFICATE OF CORRECTION

PATENT NO. : 7,755,652 B2  Page 1 of 1
APPLICATION NO. : 11/468763
DATED : July 13, 2010
INVENTOR(S) : Thomas Lloyd Credelle and Candice Hellen Brown Elliott It is certified that error appears in the above-identified patent and that said Letters Patent is hereby corrected as shown below:

Cols. 12-13, Claim 1 should read as follows:

1. A display device comprising:
    a display panel comprising a plurality of a sub-pixel repeating group; said sup-pixel repeating group comprising sixteen sub-pixels; each sub-pixel having one of at least four primary colors, wherein one of the primary colors is a non-saturated, neutral color;
    a source image data receiving unit configured to receive source image data indicating an input image, for rendering on said display panel; and
    a sub-pixel rendering unit configured to compute a luminance value for each sub-pixel of said display panel using the source image data,
    wherein said sub-pixel repeating group comprises eight sub-pixels disposed in two rows, and said sub-pixels in said four primary colors are arranged as
        1SP 2SP 1SP 2SP 3SP NSP 3SP NSP
        3SP NSP 3SP NSP 1SP 2SP 1SP 2SP
    wherein 1SP, 2SP and 3SP represent sub-pixels in first, second and third primary colors, respectively, and NSP represents a sub-pixel in said non-saturated primary color.

Signed and Sealed this

Twenty-fourth Day of August, 2010

David J. Kappos
*Director of the United States Patent and Trademark Office*